(12) United States Patent
Naito et al.

(10) Patent No.: US 8,473,703 B2
(45) Date of Patent: Jun. 25, 2013

(54) STORAGE SYSTEM AND MANAGEMENT METHOD OF THE STORAGE SYSTEM

(75) Inventors: Anna Naito, Machida (JP); Yuki Naganuma, Yokohama (JP); Wataru Okada, Yokohama (JP); Hirokazu Ikeda, Yamato (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 13/062,921

(22) PCT Filed: Feb. 23, 2011

(86) PCT No.: PCT/JP2011/001015
§ 371 (c)(1),
(2), (4) Date: Mar. 8, 2011

(87) PCT Pub. No.: WO2012/114378
PCT Pub. Date: Aug. 30, 2012

(65) Prior Publication Data
US 2012/0216005 A1   Aug. 23, 2012

(51) Int. Cl.
*G06F 12/08* (2006.01)
(52) U.S. Cl.
USPC .......................................... 711/165
(58) Field of Classification Search
None
See application file for complete search history.

(56) References Cited

U.S. PATENT DOCUMENTS

| | | | |
|---|---|---|---|
| 7,461,196 B2 * | 12/2008 | Kawamura et al. | 711/2 |
| 7,603,507 B2 * | 10/2009 | Yagi et al. | 710/316 |
| 2006/0143422 A1 * | 6/2006 | Mashima et al. | 711/170 |
| 2009/0049241 A1 | 2/2009 | Ohno et al. | |
| 2009/0249012 A1 * | 10/2009 | Umemura | 711/162 |

FOREIGN PATENT DOCUMENTS

| | | |
|---|---|---|
| EP | 1 674 984 A2 | 6/2006 |
| EP | 1 857 918 A2 | 11/2007 |
| JP | 2004-005370 | 1/2004 |

OTHER PUBLICATIONS

Search Report and Written Opinion mailed Oct. 28, 2011 in International Application No. PCT/JP2011/001015.

* cited by examiner

*Primary Examiner* — Sanjiv Shah
*Assistant Examiner* — Gautam Sain
(74) *Attorney, Agent, or Firm* — Foley & Lardner LLP

(57) ABSTRACT

Even if no port of the attribute communicable with communication ports which the other storage control apparatuses comprise exists among the communication ports which the storage control apparatus comprises, connecting the respective storage control apparatuses as communicable.

Among communication ports, the migration source communication port and the migration destination communication port are selected. The path connected to the migration source communication port is migrated to the migration destination communication port, and the migration source communication port is made a free communication port. The attribute of the free communication port is changed to a specified attribute, and the communication port of the other storage control apparatus is connected to the communication port.

10 Claims, 21 Drawing Sheets

| Volume information | | | | | |
|---|---|---|---|---|---|
| C410 | C411 | C412 | C413 | C414 | C415 |
| Storage ID | Volume ID | Capacity | Host ID | LUN | Port ID |
| SD1 | Vol1 | 100GB | Host1 | 0 | Port1 |
| SD1 | Vol2 | 100GB | Host2 | 1 | Port2 |
| SD1 | Vol3 | 300GB | Host3 | 2 | Port2 |
| SD1 | Vol3 | 300GB | Host5 | 3 | Port1 |
| SD2 | Vol100 | 200GB | - | - | - |

Fig.6

| | | | | | T40 |
|---|---|---|---|---|---|
| Port information | | | | | |
| C400 | C401 | C402 | C403 | C404 | C405 |
| Storage ID | Port ID | Attribute | Maximum IOPS | Current IOPS | Maximum number of assigned paths |
| SD1 | Port1 | Target | 2.0Gbps | 1.3Gbps | 1024 |
| SD1 | Port2 | Target | 2.0Gbps | 0.2Gbps | 1024 |
| SD2 | Port3 | Target | 2.0Gbps | 0Gbps | 1024 |
| SD2 | Port4 | Target | 2.0Gbps | 0Gbps | 1024 |

| \multicolumn{6}{c|}{External connection information} |
| Volume ID | Port ID | External storage ID | External volume ID | External port ID | Capacity |
| --- | --- | --- | --- | --- | --- |
| Vol4 | Port1 | SD3 | Vol50 | Port5 | 200 GB |
| Vol5 | Port2 | SD3 | Vol75 | Port6 | 300 GB |
| Vol6 | Port2 | SD3 | Vol80 | Port5 | 100 GB |
| Vol7 | Port2 | SD2 | Vol100 | Port3 | 200 GB |

| Pool information | | | | |
|---|---|---|---|---|
| C430 | C431 | Pool capacity | | |
| Pool ID | Number of pool volumes | C432 | C433 | C434 |
| | | Total capacity | Usage rate | Threshold |
| Pool 1 | 3 | 1000GB | 73% | 70% |
| Pool 2 | 2 | 700GB | 25% | 70% |
| Pool 3 | 2 | 500GB | 13% | 70% |

STORAGE SYSTEM AND MANAGEMENT METHOD OF THE STORAGE SYSTEM

TECHNICAL FIELD

The present invention relates to a storage system and a method for managing the storage system.

BACKGROUND ART

In recent years, the data amount processed by the storage system has been increasing. For this reason, the number of environments in which, apart from an older storage control apparatus used from the beginning, a new storage control apparatus is purchased, and the older storage control apparatus and the new storage control apparatus are concurrently used is increasing.

For example, firstly, logical volumes managed by the older storage control apparatus are assigned to a host computer. If the logical volumes are used by the host computer and the free capacity falls equal to or below a specified value, a new storage control apparatus is added to the storage system. Logical volumes managed by the new storage control apparatus are assigned to the host computer. Therefore, there is a problem that this complicates the storage system management.

For solving this problem, in a conventional technology described in the Patent Literature 1, an invention in which the host computer and a first storage control apparatus are connected via a first communication path, and furthermore the first storage control apparatus and a second storage control apparatus are connected via a second communication path is described.

With the conventional technology, a data input/output request from the host computer is received by the first storage control apparatus as a representative, and the first storage control apparatus and the second storage control apparatus cooperate to process the data input/output request. The first storage control apparatus, if receiving a first data input/output request of which the first storage control apparatus is not in charge, creates a second data input/output request corresponding to the first data input/output request. The first storage control apparatus transmits the second data input/output request to the second storage control apparatus via a second communication means. The second storage control apparatus processes the second data input/output request, and returns the result of the same to the first storage control apparatus. The first storage control apparatus transmits the processing result received from the second storage control apparatus to the host computer.

CITATION LIST

Patent Literature

[PTL 1]
Japanese Patent Application Laid-Open (Kokai) No. 2004-005370

SUMMARY OF INVENTION

Technical Problem

With the conventional technology, if the first storage control apparatus does not have any free communication ports for the connection with the second storage control apparatus, the first storage control apparatus and the second storage control apparatus cannot be connected as communicable.

Therefore, the purpose of the present invention is to connect one storage control apparatus and the other storage control apparatus as communicable even if no free communication port exists in the one storage control apparatus for the connection with the other storage control apparatus.

Solution to Problem

For solving the above-mentioned problem, the storage system related to one embodiment is a storage system which includes the first storage control apparatus comprising a first controller which receives commands from the host computer via first communication ports and processes the same, the second storage control apparatus which includes a second controller comprising second communication ports, and a management computer which includes a memory and a processor which performs the processing with reference to the information stored in the memory and manages the first storage control apparatus and the second storage control apparatus, wherein, in case of associating a second logical volume managed by the second storage control apparatus with the first storage control apparatus, the management computer (A) selects a migration source first communication port from the first communication ports, (B) selects a migration destination first communication port from the first communication ports, (C) changes the path connected to the migration source first communication port to the migration destination first communication port, furthermore makes the migration source first communication port a free communication port, (D) changes the attribute of the free communication port to a specified attribute by which the connection with the second communication port is possible, (E) connects the second logical volume to the free communication port via the second communication port, and assigns the second logical volume to the host computer as the first logical volume managed by the first storage control apparatus via the free communication port changed to the specified attribute.

BRIEF DESCRIPTION OF DRAWINGS

FIG. 5 shows the configuration of a volume information table.

FIG. 6 shows the configuration of a port information table.

FIG. 13 shows the configuration of a pool information table.

DESCRIPTION OF EMBODIMENTS

Hereinafter, with reference to the figures, the embodiments of the present invention are explained. These embodiments are explained with storage apparatuses as an example of storage control apparatuses. The storage control apparatuses can be distinguished by, for example, whether physical storage devices are integrated or not. Storage control apparatuses in which physical storage devices can be integrated are storage apparatuses, for example. Storage control apparatuses in which physical storage devices are not integrated are switch devices, for example. Switch devices can provide physical storage devices which external storage apparatuses comprise to the host computer as if the physical storage devices were the storage devices in the switch devices.

It should be noted that, in the explanation below, each type of information might be explained by the expression of an "xxx table," but may also be expressed in other types of data configuration than tables. For indicating independence from the data configuration, the "xxx table" can be referred to as "xxx information."

In the explanation below, an ID (identifier) or a number is used for identifying a component, but other types of information (e.g. a name) may also be used as identification information.

In the explanation below, the processing might be explained by a "program" as a subject, but the subject of the processing may also be a processor because the program performs the specified processing by being performed by the processor (e.g. a CPU (Central Processing Unit)) while appropriately using a storage resource (e.g. a memory) and/or a communication interface device (e.g. a communication port). The processing explained by the program as a subject may also be referred to as the processing performed by a storage apparatus, a controller which the storage apparatus comprises, or a management computer. The processor may also include a hardware circuit which performs part of or the entire processing which the processor performs. The computer program may also be installed in each computer from a program source. The program source may also be, for example, a program distribution server or a storage media.

Embodiment 1

Figure 1:
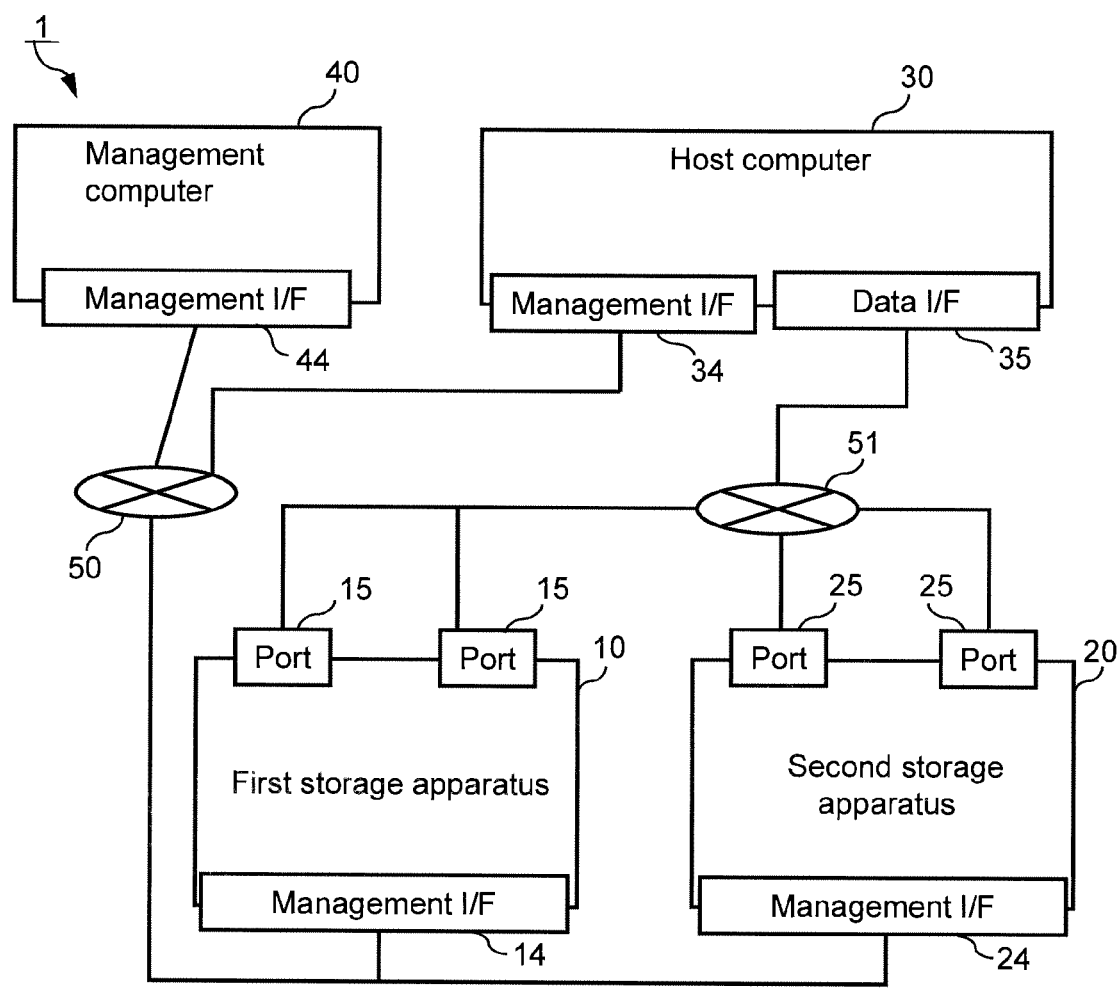
FIG. 1 shows the configuration of the computer system including the storage system related to the Embodiment 1.

The Embodiment 1 is explained with reference to Figures from 1 to 11. FIG. 1 shows the configuration of a computer system including a storage system related to the Embodiment 1.

The computer system includes a storage system 1 and a host computer 30. The storage system 1, for example, comprises a first storage apparatus 10, a second storage apparatus 20, and a management computer 40. The details of each of the devices 10, 20, 30, and 40 are explained later.

It should be noted that, for simplifying the explanation, FIG. 1 shows a case where the storage system 1 is configured of one host computer 30 and two storage apparatuses (10, 20). Not limited to this configuration, there may also be a plurality of host computers 30 and there may also be three or more storage apparatuses (10, 20).

A management I/F (Inter Face) 14 of the first storage apparatus 10, a management I/F 24 of the second storage apparatus 20, a management I/F 34 of the host computer 30, and a management I/F 44 of the management computer 40 are connected via a specified management network (e.g. LAN (Local Area Network)) 50. This makes the management computer 40 communicable with the first storage apparatus 10, the second storage apparatus 20, and the host computer 30. It should be noted that, if the management network 50 is LAN, each of the management I/Fs (14, 24, 34, 44) is a LAN card, for example.

A communication port 15 of the first storage apparatus 10, a communication port 25 of the second storage apparatus 20, and a data I/F 35 of the host computer 30 are connected via a specified data communication network (e.g. SAN (Storage Area Network)) 51. This makes the first storage apparatus 10, the second storage apparatus 20, and the host computer 30 mutually communicable. It should be noted that, if the data communication network 51 is SAN, HBA (Host Bus Adapter) can be used as the data I/F 35.

The technology referred to as external connection is explained below. The external connection technology is a technology that one storage apparatus takes in a storage resource which the other storage apparatus comprises, and shows the same to the host computer as if the storage resource were the storage resource of the one storage apparatus.

The one storage apparatus is also referred to as the connection source storage apparatus. The other storage apparatus is referred to as the connection destination storage apparatus or the external storage apparatus. A virtual logical volume is set in the connection source storage apparatus, and the virtual logical volume and a logical volume in the connection destination storage apparatus are made to correspond to each other. The virtual logical volume is referred to as an external connection volume. The logical volume connected to the external connection volume is referred to as an external volume.

It should be noted that the logical volumes can be classified into virtual logical volumes and actual logical volumes. The virtual logical volumes are virtual logical storage devices which are not directly based on physical storage areas. The actual logical volumes are logical storage devices based on physical storage areas. The virtual logical volumes might also be referred to as virtual volumes. The actual logical volumes might also be referred to as actual volumes.

A case where an external connection volume is set in the first storage apparatus 10 and an actual volume which the second storage apparatus 20 comprises is connected to the external connection volume in the first storage apparatus 10 is explained. Therefore, the second storage apparatus 20 is an external storage apparatus. Hereinafter, the second storage apparatus 20 might also be referred to as the external storage apparatus 20.

The second storage apparatus 20 creates at least one external volume 27A (refer to FIG. 9) in accordance with physical storage devices 26 (refer to FIG. 4) managed by the second storage apparatus 20. Among a plurality of actual volumes 27 which the second storage apparatus 20 comprises, the actual volume connected to the external connection volume 17B of the first storage apparatus 10 (refer to FIG. 9) is referred to as an external volume 27A.

The first storage apparatus 10 manages a first logical volume. The first logical volume includes an internal volume 17A and an external connection volume 178 (refer to FIG. 9). The internal volume 17A is an actual logical volume created based on a physical storage device 16 managed by the first storage apparatus 10. The external connection volume 17B is, as described above, a virtual volume for connecting the external volume 27A managed by the second storage apparatus 20 which is an external storage apparatus.

The first storage apparatus 10 connects the external volume 27A managed by the second storage apparatus 20 to the external connection volume 17B, and assigns the external connection volume 17B to the host computer 30. The host computer 30 recognizes the external connection volume 17B as the first logical volume which the first storage apparatus 10 comprises. If the host computer 30 issues an I/O (input/output) command whose target is the external connection volume 17B, the first storage apparatus 10 generates the other command in accordance with the command. The other command is a command for instructing a data input/output request for the external volume 27A. The first storage apparatus 10 transmits the other command to the second storage apparatus 20. The second storage apparatus 20 transmits the processing result of the other command to the first storage apparatus 10.

Figure 2:
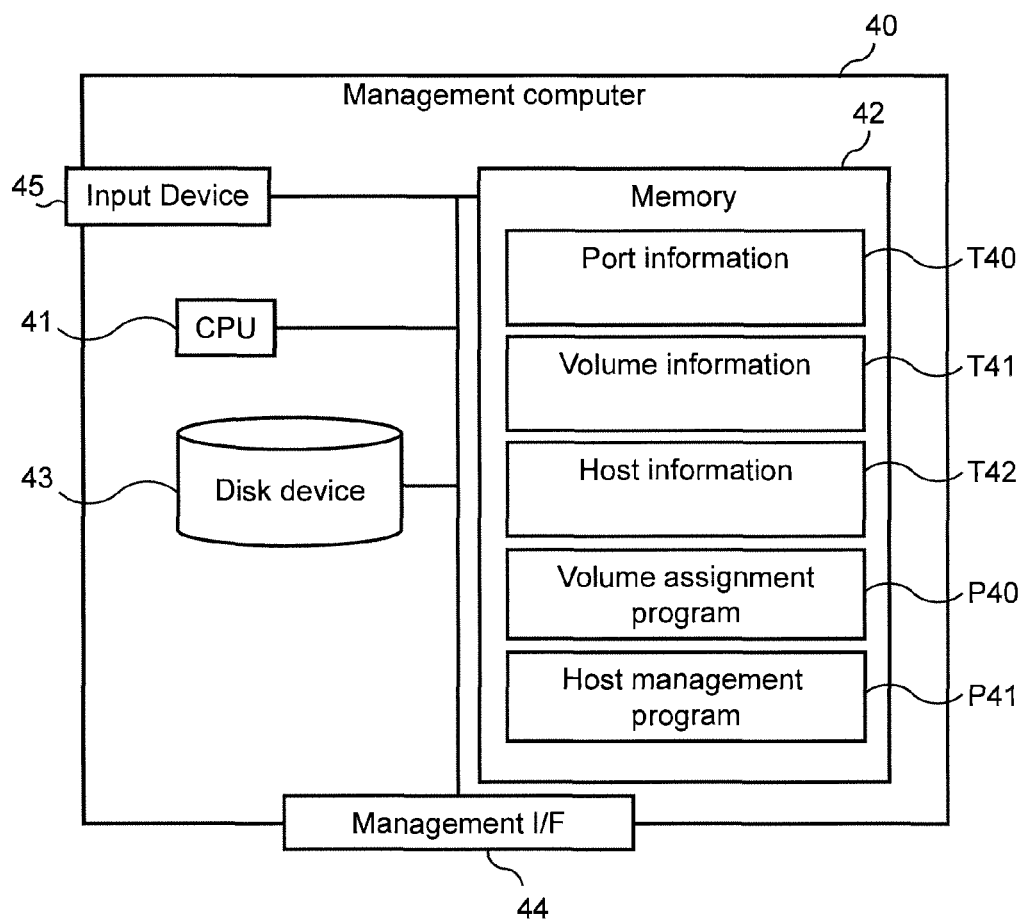
FIG. 2 shows the configuration of the management computer.

FIG. 2 shows the configuration of the management computer. The management computer 40 comprises a function of managing the first storage apparatus 10 and the second storage apparatus 20.

The management computer 40 comprises, for example, a processor (a CPU (Central Processing Unit) in the FIG. 41, a memory 42, a disk device 43, the management I/F 44, and an input device 45.

The processor 41 performs programs P40, P41 which are stored in the memory 42 and realizes the function explained later.

In the memory 42, for example, a port information T40, a volume information T41, a host information T42, a volume assignment program P40, and a host management program P41 are stored.

The port information T40, the volume information T41, and the host information T42 are explained later.

The volume assignment program P40 is a computer program for controlling the assignment of logical volumes. For example, the volume assignment program P40 can assign the first logical volume from the first storage apparatus 10 to the host computer 30. Furthermore, the volume assignment program P40 can assign the external volume 27A of the second storage apparatus 20 to the external connection volume 17B of the first storage apparatus 10.

The volume assignment program P40 transmits an instruction which is necessary for volume assignment to a necessary program among the various types of programs. The various types of programs are the host management program P41, a path management program P30, device management programs P10 and P20, volume management programs P11 and P21, external connection programs P12 and P22, and port management programs P13 and P23. P30, P10, P20, P11, P21, P12, P22, P13, and P23 are explained later.

The host management program P41 is a computer program for managing the information of the host computer 30 which an agent program P31 (refer to FIG. 3) explained later collected by the management computer 40.

The disk device 43 is a physical storage device. The disk device 43 is, for example, an HDD (Hard Disk Drive), an SSD (Solid State Drive), and others.

The management I/F 44 is a communication interface for the management computer 40 to access the first storage apparatus 10 and the external storage apparatus 20 via the management network 50.

The input device 45 is a device for the user such as the system administrator to give instructions to the management computer 40. The input device 45 is, for example, a keyboard, a pointing device, a switch, a touch panel, a microphone, and others. The input device 45 may also comprise an information output device for outputting information. The information output device is, for example, a monitor display, a speaker, a printer, and others.

Figure 3:
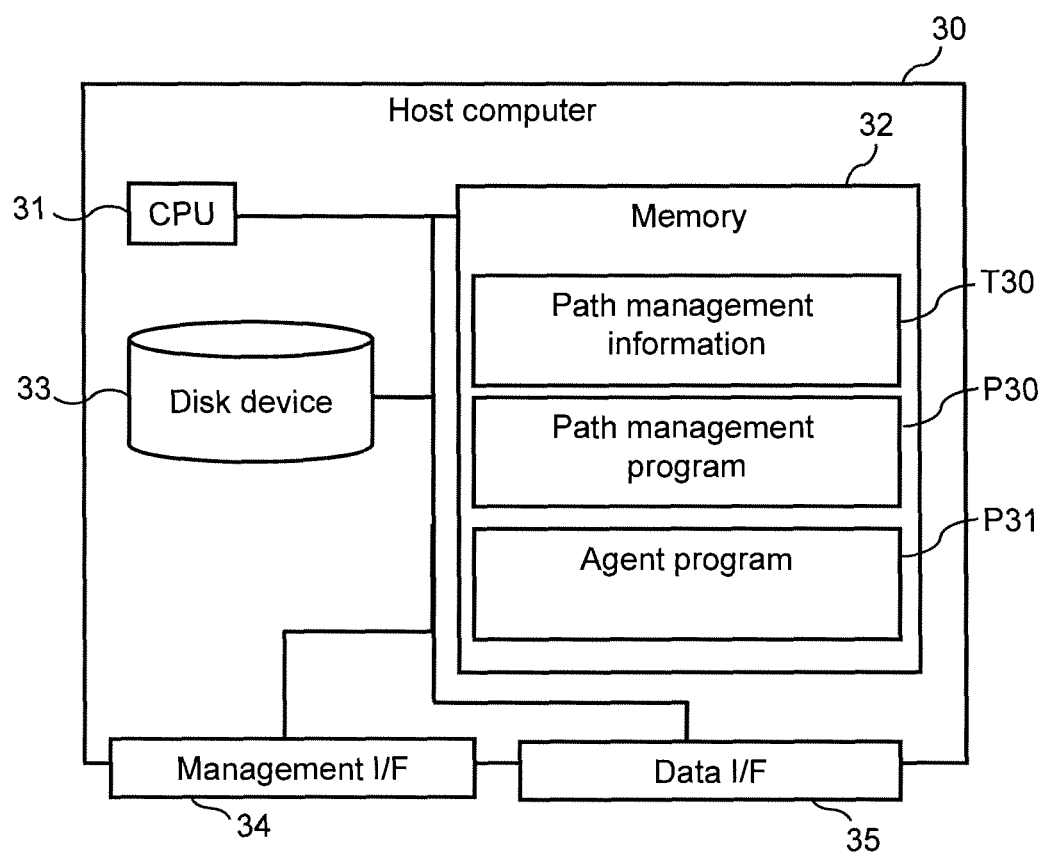
FIG. 3 shows the configuration of the host computer.

FIG. 3 shows the configuration of the host computer. The host computer 30 comprises a function for issuing I/O commands for reading and writing data from and to logical volumes.

The host computer 30 comprises, for example, a processor 31, a memory 32, a disk device 33, the management I/F 34, and the data I/F 35.

The processor 31 performs specified processing in accordance with respective programs stored in the memory 32. In the memory 32, for example, path management information T30, the path management program P30, and the agent program P31 are stored. The path management information T30 is explained later.

The path management program P30 is a computer program for managing communication paths set between the host computer 30 and the respective storage apparatuses 10, 20.

The communication paths are set between the data I/F 35 and the communication ports 15 of the first storage apparatus 10 and between the data I/F 35 and the communication ports 25 of the second storage apparatus 20. The path management program P30 sets each of the communication paths and deletes the set communication paths. Furthermore, the path management program P30 performs the processing of transmitting and receiving I/O commands to and from logical volumes.

The agent program P31 is a computer program for collecting and managing information related to the host computer 30. The agent program P31 collects information related to the host computer 30 in response to instructions from the host management program P41, and provides the same to the management computer 40.

The disk device 33 is configured of, for example, HDDs (Hard Disk Drives), SSDs (Solid State Drives), and others.

The management I/F 34 is a communication interface for accessing the management computer 40, the first storage apparatus 10, and the second storage apparatus 20 via the management network 50.

The data I/F 35 is a communication interface for accessing the first storage apparatus 10 and the second storage apparatus 20 via the data communication network 51.

Figure 4:
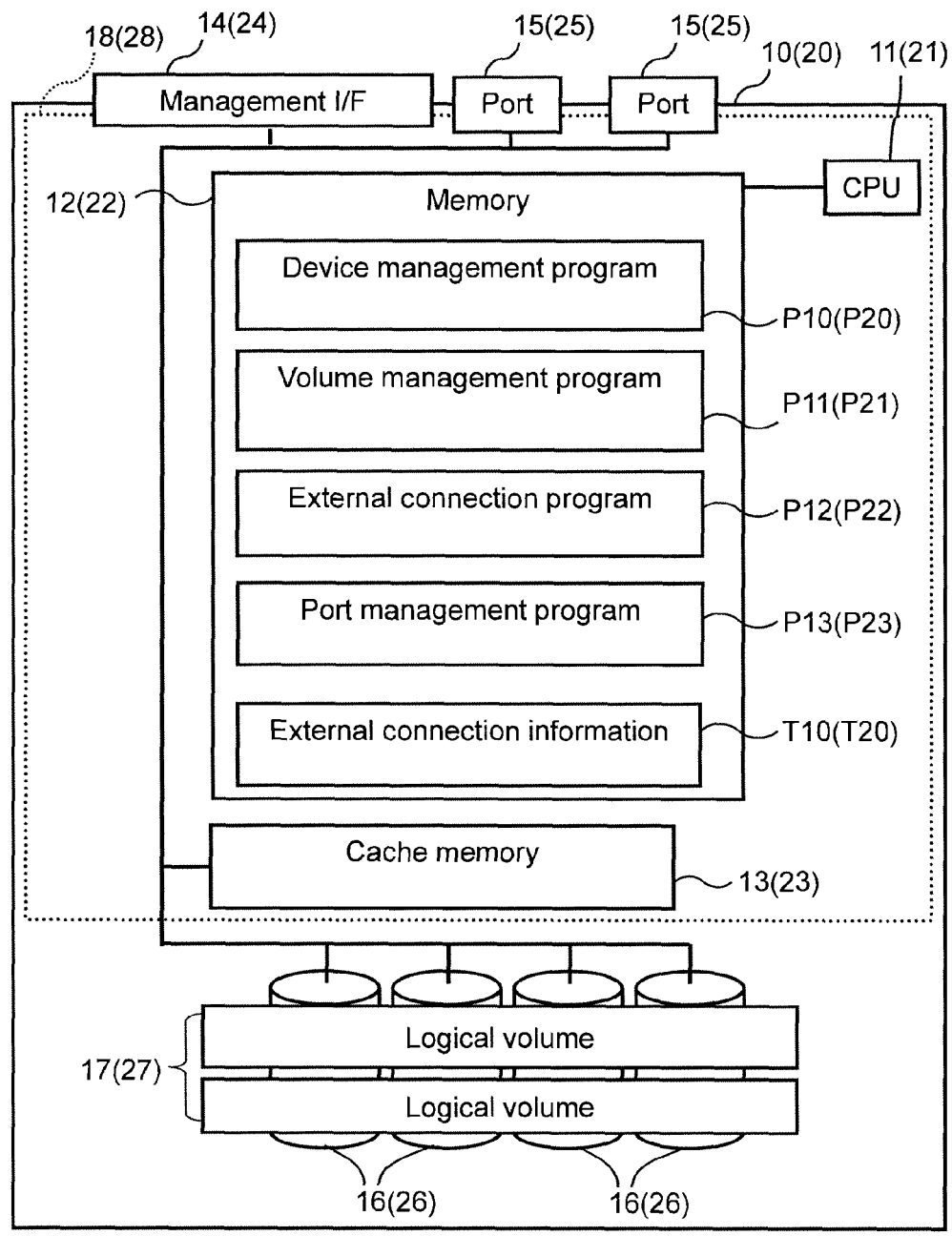
FIG. 4 shows the configuration of the first storage apparatus and the second storage apparatus.

FIG. 4 shows the configuration of the storage apparatus. The storage apparatuses 10, 20 can be configured in nearly the same manner. Therefore, the configurations of the first storage apparatus 10 and the second storage apparatus 20 are explained by one figure. In FIG. 4, as 11 (21), 12 (22), and P10 (P20), the numbers given to the same types of components of the second storage apparatus 20 are shown following the numbers given to the components of the first storage apparatus 10.

The storage apparatus 10 (20), for example, comprises a processor 11 (21), a memory 12 (22), a cache memory 13

(23), a management I/F 14 (24), communication ports 15 (25), and physical storage devices 16 (26).

The controller 18 (28) is configured of the processor 11 (21), the memory 12 (22), the cache memory 13 (23), the management I/F (24), and the communication ports 15 (25). The controller 18 (28) controls the operation of the storage apparatus 10 (20).

The processor 11 (21) performs various types of programs stored in the memory 12 (22), and achieves specified functions.

In the memory 12 (22), for example, the device management program P10 (P20), the volume management program P11 (P21), the external connection program P12 (P22), the port management program P13 (P23), and external connection information T10 (T20) can be stored. The external connection information T10 (T20) is explained later.

It should be noted that the second storage apparatus 20 does not necessarily have to comprise exactly the same computer programs as the first storage apparatus 10 does. In this embodiment, the first storage apparatus 10 takes the logical volumes (external volumes) of the second storage apparatus 20 in the first storage apparatus 10 and provides the same to the host computer 30. Therefore, the second storage apparatus 20 has only to comprise the function of being able to provide the external volumes to the first storage apparatus 10.

However, the second storage apparatus 20, the same as the first storage apparatus 10, may also be configured to be able to take the logical volumes existing outside the second storage apparatus 20 in the second storage apparatus 20 and provide the same to the host computer 30. In this case, the second storage apparatus 20 can comprise the same computer programs as the first storage apparatus 10 does.

The device management program P10 (P20) is a computer program for managing the first storage apparatus 10 and the second storage apparatus 20. Specifically speaking, the device management program P10 (P20) can perform specified setting and others for external storage apparatuses which provide external volumes as well as for the local storage apparatus. The device management program P10 (P20) accepts an I/O command from the host computer 30. The device management program P10 (P20), if the target of the command is an external connection volume, generates the other command corresponding to the command, and transmits the generated other command to the external storage apparatus. Furthermore, the device management program P10 (P20) performs various types of setting for each of the storage apparatuses 10, 20 and collects information from each of the storage apparatuses 10, 20.

The volume management program P11 (P21) is a computer program for managing logical volumes. The volume management program P11 (P21) performs, for example, the generation, deletion and assignment to the communication ports 15 (25) of the logical volumes which the storage apparatus 10 comprises and the logical volumes which the storage apparatus 20 comprises and information collection from the respective logical volumes.

The external connection program P12 (P22) manages external volumes managed in the external storage apparatuses. The external connection program P12 in the first storage apparatus 10 is explained below as an example. The external connection program P12 connects the external volumes in the second storage apparatus 20 to the external connection volumes in the first storage apparatus 10 via the second communication ports 25 of the second storage apparatus 20 and via the first communication ports 15 of the first storage apparatus 10.

The case where the second storage apparatus 20 comprises external connection volumes and the first storage apparatus 10 comprises external volumes is considered. In this case, the external connection program P22 manages the external volumes of the first storage apparatus 10 which is the external storage apparatus, and manages the connection of the external connection volumes to the external volumes and others.

The port management program P13 (P23) manages the communication ports 15 (25).

The cache memory 13 (23) temporarily stores data to be written and read to and from logical volumes (internal actual volumes or external volumes). For example, the cache memory 13 (23) stores write data from the host computer 30. Subsequently, at a specified timing, an instruction is issued from the CPU 11 (21). By the instruction, the write data stored in the cache memory 13 (23) is written to a specified disk device 16 (26).

The management I/F 14 (24) is an interface for accessing the management computer 40 and the other storage apparatus via the management network 50. The other storage apparatus in this explanation indicates the second storage apparatus 20 as seen from the first storage apparatus 10 or the first storage apparatus 10 as seen from the second storage apparatus 20.

The communication ports 15 (25) are interfaces for accessing the host computer 30 and the other storage apparatus via the data communication network 51.

The disk device 16 (26) is a physical storage device. As the disk devices 16 (26), various types of devices by which data can be read and written, for example, hard disk drives, semiconductor memory drives, optical disk drives, magneto-optical disk drives, and others, can be used.

In using hard disk drives, for example, FC (Fibre Channel) disks, SCSI (Small Computer System Interface) disks, SATA disks, ATA (Attachment) disks, SAS (Serial Attached SCSI) disks, and others can be used. Furthermore, storage devices, for example, a flash memory, FeRAM (Ferroelectric Random Access Memory), MRAM (Magnetoresistive Random Access Memory), phase-change memory (Ovonic Unifield Memory), RRAM (Resistance RAM) and others, can also be used.

By operating a plurality of disk devices 16 (26) in the RAID (Redundant Array of Independent Disks) system, the physical storage areas which the respective disk devices comprise can be formed into a group. In accordance with the grouped physical storage areas, one or a plurality of logical volumes 17 (27) are generated.

The logical volumes managed by the first storage apparatus 10 are first logical volumes 17. As explained later in FIG. 9, the first logical volumes 17 can be classified into the internal volumes (actual volumes) 17A based on the disk device 16 in the first storage apparatus 10 and the external connection volumes 17B based on the actual volumes 27 in the second storage apparatus 20. The second storage apparatus 20 comprises external volumes 27A for providing the storage area to the external connection volumes 17B. The external volumes 27A are generated in accordance with the disk device 26 in the second storage apparatus 20.

FIG. 5 shows the configuration of the volume information table T41. The volume information table T41 is managed by the management computer 40. The volume information table T41 stores the information related to all the volumes in the storage system per storage apparatus. For example, the volume information table T41 manages a volume ID C411, a capacity C412, a host ID C413, an LUN (Logical Unit Number) C414, and a port ID C415 per storage ID C410 by making the same correspond to one another.

The storage ID C410 is the information for identifying between the storage apparatuses 10, 20. As the storage IDs, in this embodiment, the value such as SD1 or SD2 is set. SD1 indicates the first storage apparatus 10. SD2 indicates the second storage apparatus 20. In the figure, for convenience, the first storage apparatus 10 is abbreviated to "storage 1" and the second storage apparatus 20 is abbreviated to "storage 2" respectively.

The volume ID C411 is the information for identifying the respective volumes. The value of the volume ID has only to be uniquely identified in each of the storage apparatuses. By managing the storage ID C410 and the volume ID C411 as a combination, the management computer 40 can identify each of the volume in the storage system. The capacity C412 is the information indicating the volume capacity.

The host ID C413 is the information for identifying the host computers 30. For the host ID C413, the ID of the host computer 30 which uses the logical volumes is set. In the figure, as the values of the host IDs C413, for example, "Host1," "Host2," "Host3," and "Host5" are used. For example, the volume whose volume ID C411 is "Vol1" indicates the logical volume assigned to the host computer whose ID C413 is "Host1" The volume whose volume ID C411 is "Vol100," as the host ID C413 is "-" indicates that the volume is not assigned to any host computer 30.

The LUN C414 is the information for making the host computer 30 recognize each of the volumes. The host computer 30 specifies a LUN C414 and transmits an I/O command.

The port ID C415 is the information for identifying communication ports 15 (25) to which the volumes identified by the volume ID C411 are logically connected. To one communication port, a plurality of logical volumes can also be connected.

FIG. 6 shows the configuration of the port information table T40. The port information table T40 is managed by the management computer 40. The port information table T40 comprises the information related to the communication ports 15, 25 which each of the storage apparatuses 10, 20 comprises. For example, the port information table T40 manages a port ID C401, an attribute C402, a maximum IOPS (Input Output Per Second) C403, a current IPOS C404, and a maximum number of assigned paths C405 per storage ID C400 by making the same correspond to one another.

The storage ID C400 is the information for identifying the respective storage apparatuses 10, 20. The port ID C401 is the information for identifying the respective communication ports 15 (25).

The attribute C402 is the information indicating the attribute of each of the communication ports 15 (25). The attribute indicates whether each of the communication ports 15 (25) is the issuance source of an I/O command or the reception destination. The attribute C402 is "Initiator," "Target," "External," or "Used in combination."

The communication port whose attribute C402 is "Initiator" indicates the communication port which is the issuance source of the I/O command. The communication port whose attribute C402 is "Target" indicates the communication port which is the reception destination of the I/O command. The communication port whose attribute is "External" comprises the attribute of the Initiator communication port. The "External" communication port is a communication port for the connection with the external volumes. The communication port whose attribute is "Used in combination" indicates the communication port comprising the attributes of both "Initiator" and "Target."

The maximum IOPS C403 is the information indicating the maximum TOPS that each of the communication ports 15, 25 can accept. The current IOPS C404 is the information indicating the latest IOPS when the management computer 40 measures the IOPS of each of the communication ports 15, 25.

The maximum number of assigned paths C405 is the information indicating the maximum number of logical paths that can be connected to each of the communication ports 15 (25).

Figure 7:
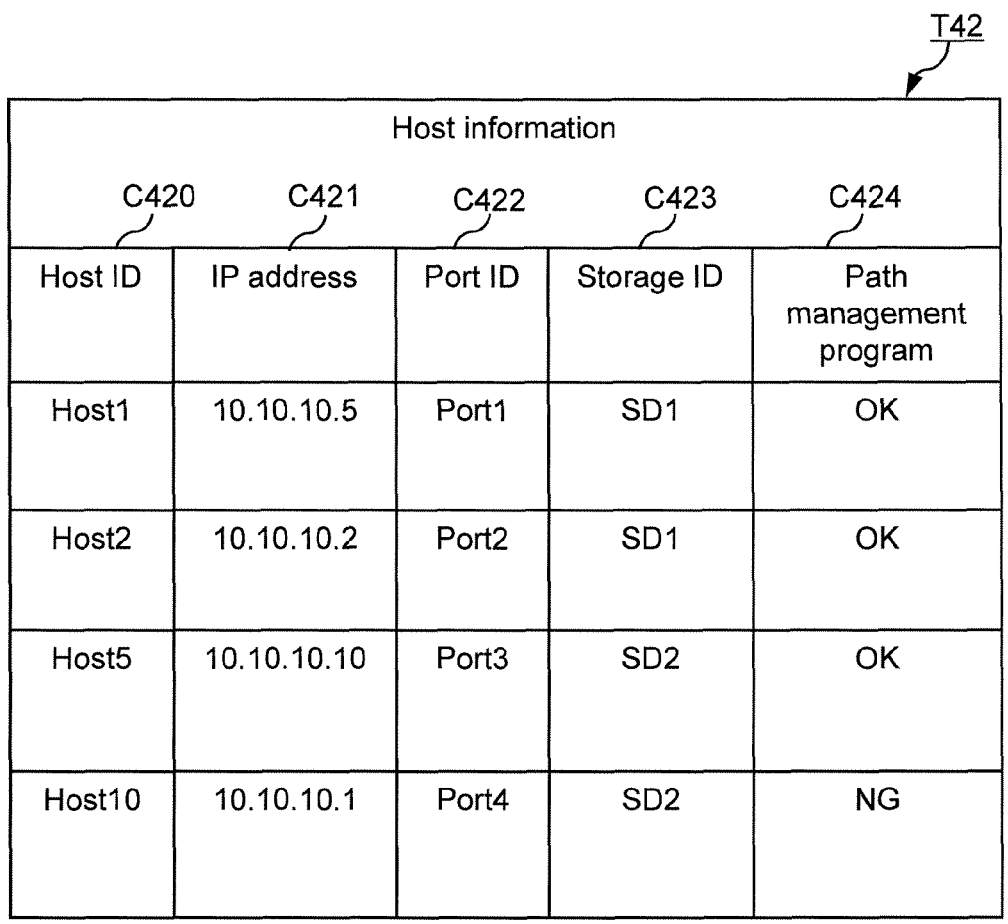
FIG. 7 shows the configuration of a host information table.

FIG. 7 shows the configuration of the host information table T42. The host information table T42 is managed by the management computer 40. The host information table T42 comprises the information related to all the host computers 30. For example, the host information table T42 manages an IP address C421, a port ID C422, a storage ID C423, and a path management program C424 per host ID C420 by making the same correspond to one another.

The host ID C420 is the information for identifying the host computers 30. The IP address C421 is the information indicating the IP address assigned to each of the host computers 30.

The port ID C422 is the information for identifying the communication port connected to the host computer 30 among the respective communication ports 15, 25 which the storage apparatus 10, 20 comprises.

The storage ID C423 is the information for identifying the storage apparatus 10, 20 which comprises the communication port indicated by the port ID C422.

The path management program C424 is the information indicating whether the host computer 30 comprises the path management program P30 or not. If the host computer 30 comprises the path management program P30, "OK" is set for the path management program C424. If the host computer 30 does not comprise the path management program P30, "NG" is set for the path management program C424.

Figure 8:
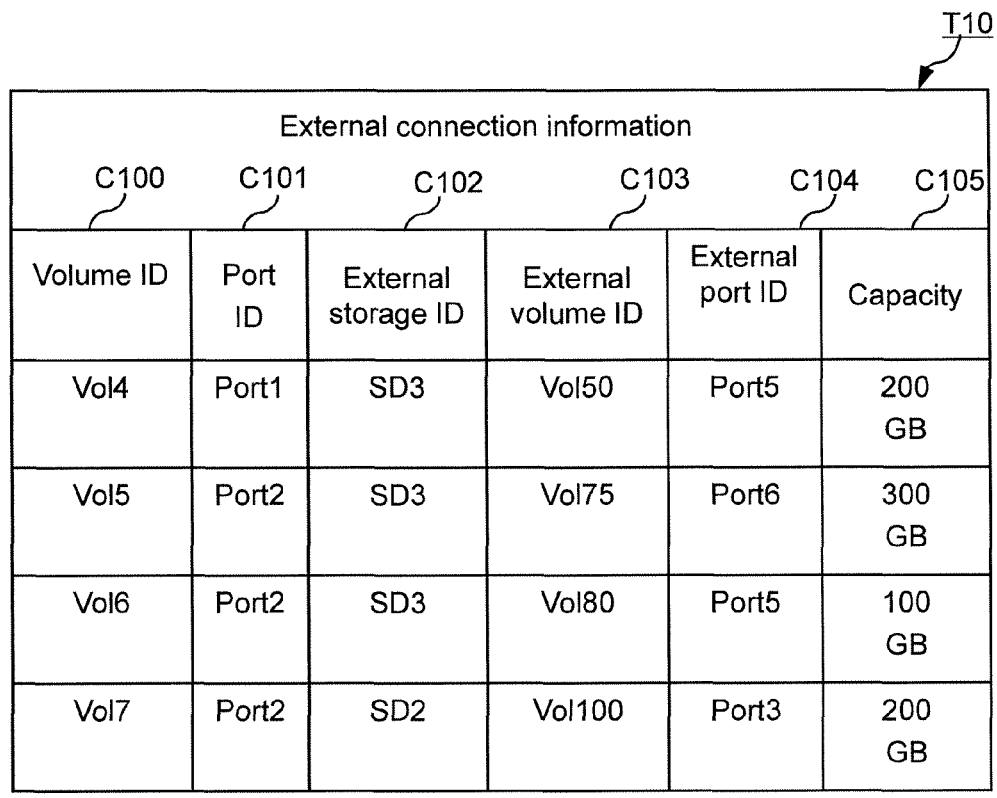
FIG. 8 shows the configuration of an external connection information table.

FIG. 8 shows the configuration of the external connection information table T10 (or T20). At this point, the case where the first storage apparatus 10 utilizes the storage area which the second storage apparatus 20 comprises is explained. Therefore, in this embodiment, the external connection information table T10 is managed in the first storage apparatus 10.

The external connection information table T10 comprises the information related to the relationship between the external connection volumes 17B of the first storage apparatus 10 and the external volumes 27A of the second storage apparatus 20. FIG. 8 shows two units as external storage apparatuses, which are the second storage apparatus and the third storage apparatus. However, in this embodiment, the second storage apparatus 20 is used as an external storage apparatus.

The external connection information table T10, for example, manages a port ID C101, an external storage apparatus ID C102, an external volume ID C103, an external port ID C104, and a capacity C105 per volume ID C100 by making the same correspond to one another.

The volume ID C100 is the ID of the volume managed by the first storage apparatus 10. Specifically speaking, in the volume ID C100, among all the volumes managed in the storage apparatus where the external connection information table T10 is stored, the identification information of the external connection volume connected to the external volume is stored. The port ID C101 is the ID of the first communication port 15 connected to the external connection volume.

The external storage apparatus ID C102 is the ID of the storage apparatus which comprises the external volume connected to the external connection volume. The external volume ID C103 is the information for identifying each of the external volumes.

The external port ID C104 indicates the ID of the second communication port 25 connected to the external volume. The capacity C105 is the information indicating the capacity of the external volume.

For example, an external connection volume whose volume ID C100 is "Vol7" is connected to the communication port 15 of the first storage apparatus 10 identified by "Port2." The external connection volume (Vol7) is connected to the communication port 25 (Port3) of the second storage apparatus 20 via the communication port 15 and the communication network 51. The external connection volume (Vol7) is connected to the external volume (Vol100) in the second storage apparatus 20.

Figure 9:
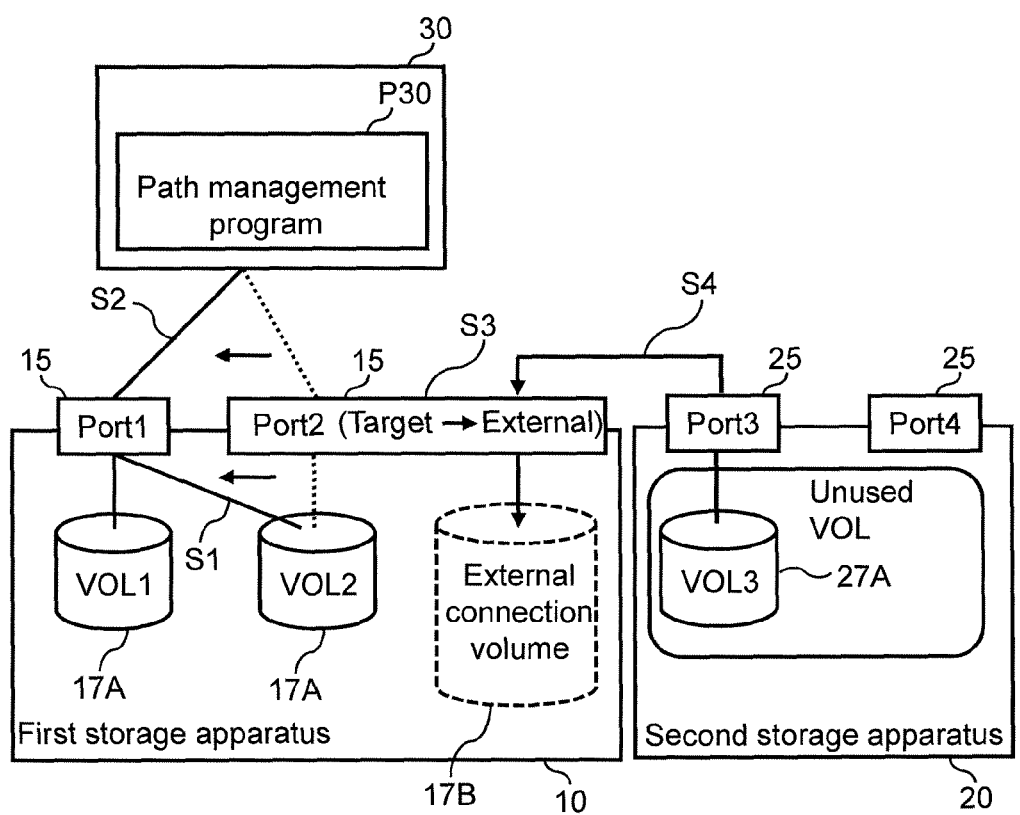
FIG. 9 is a pattern diagram showing the overview of the processing of the storage system.

FIG. 9 is a pattern diagram showing the flow of the processing of the storage system. Hereinafter, a step is abbreviated to an S. The first storage apparatus 10 comprises three logical volumes. The two of the same are internal volumes 17A. The other one is an external connection volume 17B.

Each of the internal volumes 17A is generated in accordance with the disk devices 16 which the first storage apparatus 10 comprises. Each of the internal volumes 17A is an actual volume. Meanwhile, the external connection volume 17B is a virtually generated logical volume, and is not based on the disk devices 16 in the first storage apparatus 10. The external connection volume 17B is connected to the actual volume 27A which the second storage apparatus 20 comprises. The actual volume 27A, which exists outside the first storage apparatus 10, is referred to as an external volume.

Initially, the first storage apparatus 10 provides two logical volumes 17A to the host computer 30. One of the logical volumes 17A (VOL1) is connected to the host computer 30 via the communication port 15 indicated by "Port1." The other logical volume 17A (VOL2) is connected to the host computer 30 via the communication port 15 indicated by "Port2" The communication port 35 of the host computer 30 is the Initiator port. Each of the communication ports "Port1," "Port2" of the first storage apparatus 10 is the Target port.

The user can create a new logical volume in the first storage apparatus 10, for example, if the free capacity of the logical volumes 17A becomes scarce and in other cases.

If the free storage area in the first storage apparatus 10 is scarce, the user gives an instruction to the first storage apparatus 10 via the management computer 40, and has the external connection volume 17B created in the first storage apparatus 10.

If the external volume 27A which the second storage apparatus 20 comprises can be connected to the external connection volume 17B by the instruction from the management computer 40, a new logical volume can be set in the first storage apparatus 10.

However, the two communication ports 15 (Port1), 15 (Port2) which the first storage apparatus 10 comprises are already used by the host computer 30. Therefore, in FIG. 9, no free communication port to be used for the connection between the external connection volume 17B and the external volume 27A is supposed to exist.

Therefore, the management computer 40 selects one migration source communication port 15 (Port2) from a plurality of communication ports 15 (Port1), 15 (Port2) which are in use. Furthermore, the management computer 40 selects the other communication port 15 (Port1) as the migration destination communication port.

The first storage apparatus 10, in accordance with the instruction from the management computer 40, switches the connection destination of the logical volume 17A (Vol2) from the migration source communication port 15 (Port2) to the migration destination communication port 15 (Port1) (S1).

The path management program P30 of the host computer 30 switches the communication port 35 of the host computer 30 from the migration source communication port 15 (Port2) to the migration destination communication port 15 (Port1) (S2).

This makes the migration source communication port 15 (Port2) unused. The communication port (Port2) becomes a free communication port which is not connected to any components.

The management computer 40 gives an instruction to the first storage apparatus 10 and makes the attribute of the communication port 15 (Port2) which became the free communication port changed from "Target" to "External" (S3). This makes the communication port 15 (Port2) available for external connection.

The management computer 40, by giving an instruction to each of the first storage apparatus 10 and the second storage apparatus 20, has the communication port 15 (Port2) comprising the "External" attribute of the first storage apparatus 10 connected to the communication port 25 (Port3) of the second storage apparatus 20 (S4).

The management computer 40 gives an instruction to the second storage apparatus 20 and makes the unused external volume 27A which the second storage apparatus 20 manages connected to the communication port 25 (Port3). This makes the external connection volume 173 connected to the external volume 27A via the communication port 15 (Port2), the communication network 51, and the communication port 25 (Port3). The volume assignment program P40 of the management computer 40 makes the external connection volume 17B connected to the communication port 35 of the host computer 30 via the communication port 15 (Port2) and the communication network 51.

Figure 10:
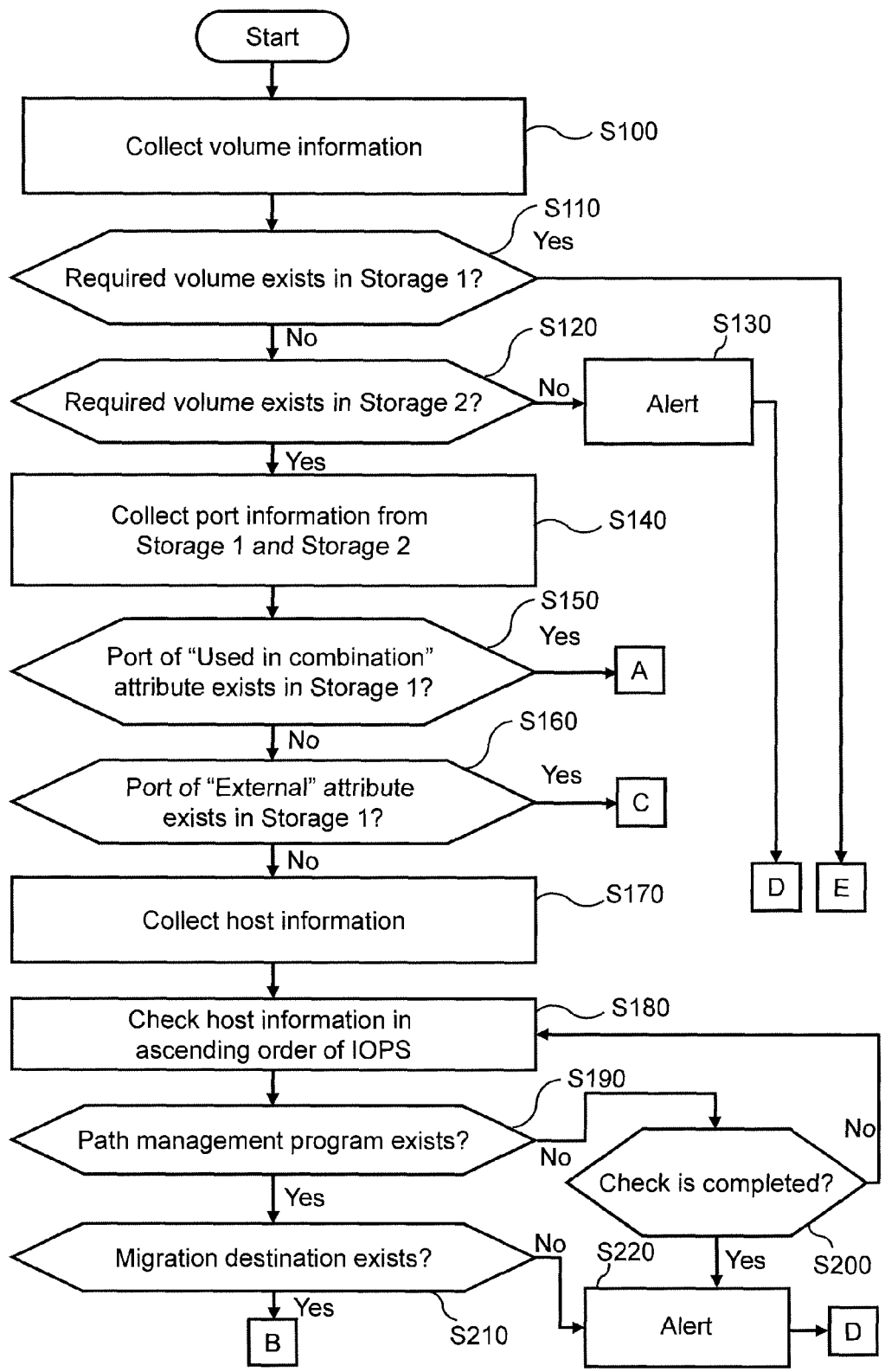
FIG. 10 is a flowchart showing the processing of assigning an external volume to the host computer.
Figure 11:
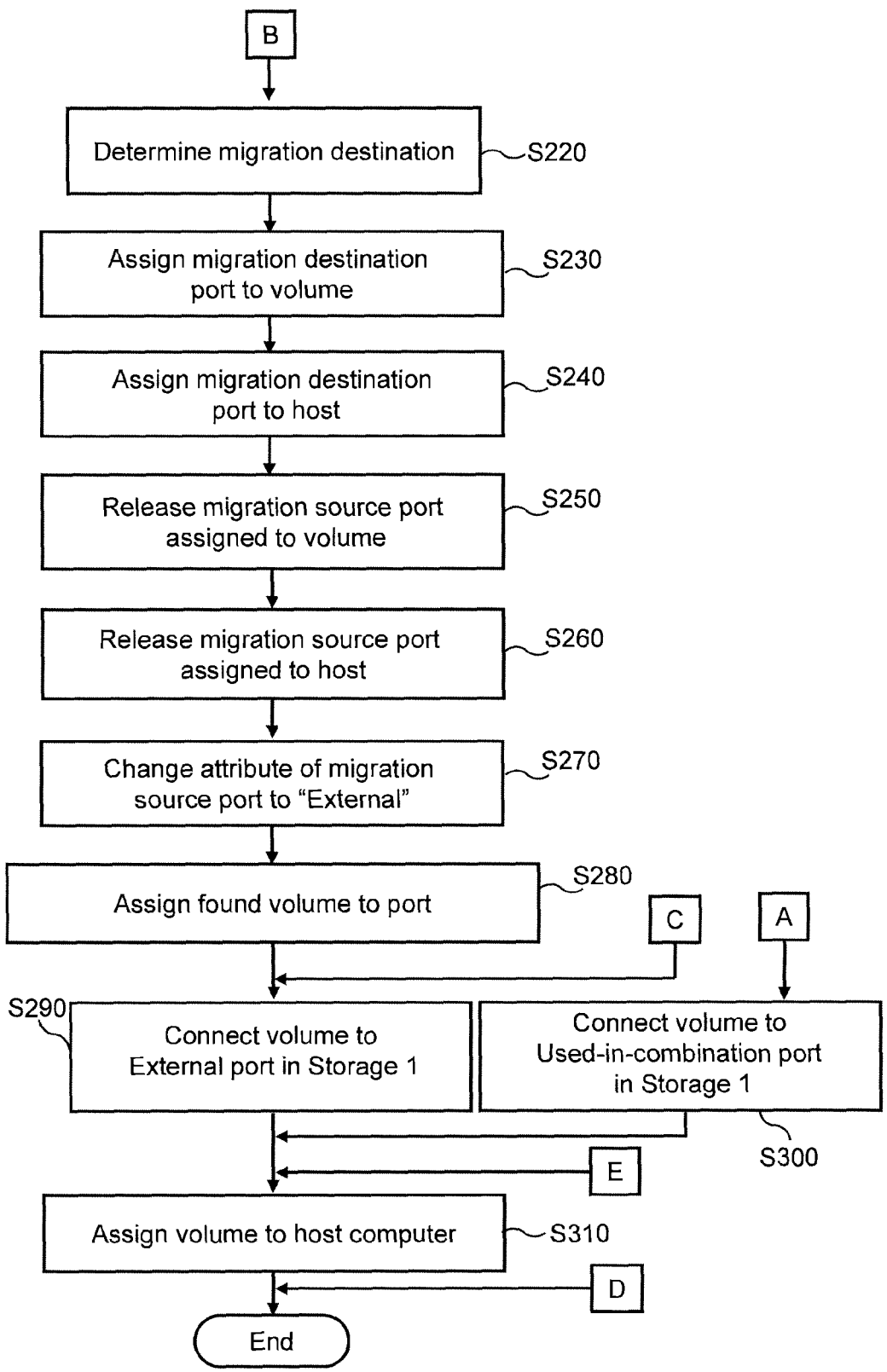
FIG. 11 is a flowchart following FIG. 10.

FIG. 10 and FIG. 11 are the flowcharts showing the processing of assigning a volume to the host computer 30.

If a request for creating a new volume to be assigned to the host computer 30 is made from the user to the management computer 40, the volume assignment program P40 starts the processing below.

For example, if the user instructs the management computer 40 to assign a volume comprising the capacity of 200 GB to the host computer 30, the volume assignment program P40 operates.

The volume assignment program P40 instructs the volume management program P11 of the first storage apparatus 10 to collect the information related to all the volumes (S100). The collected information related to each of the volumes is stored in the volume information table T41 by the volume management program P11.

The volume assignment program P40 determines whether the volume required by the user exists in the first storage apparatus 10 or not (S110). For example, the volume assignment program P40 confirms the capacity C412 of the volume information table T41, and determines whether an unused volume of the size required by the user exists or not.

If an unused volume comprising the same capacity as the required volume capacity exists in the first storage apparatus 10 (S110: Yes), the volume assignment program P40 assigns the unused volume to the host computer 30 (S310 in FIG. 11).

If no unused volume matching the required volume capacity exists in the first storage apparatus 10 (S110: No), the volume assignment program P40 determines whether an unused volume matching the required volume capacity exists in the second storage apparatus 20 or not (S120).

An example of S120 is explained below. Firstly, the volume assignment program P40 confirms whether a storage apparatus 20 not connected to any of the host computers 30 exists or not by the value of the host ID C413 of the volume information table T41.

Secondly, if a storage apparatus 20 not connected to any of the host computers 30 is found, the volume assignment program P40 confirms the free capacity of the storage apparatus 20. Specifically speaking, the volume assignment program P40 determines whether the storage apparatus 20 comprises the free capacity equal to or larger than the volume capacity required by the user with reference to the value of the capacity C412 of the volume information table T41.

Whether the required volume exists in the storage apparatus or not can be determined, for example, with reference to whether an unused volume comprising the capacity equal to or larger than the required volume capacity exists or not. If no unused volume exists in the storage apparatus, the determination can be made with reference to whether the unused storage area equal to or larger than the required volume capacity (storage area of the RAID group) exists in the storage apparatus or not. By using the unused storage area, the volume of the required size can be created.

It should be noted that, though the case where the user only specifies the volume capacity is explained, the configuration where a RAID level and/or a disk device type are/is specified in addition to the volume capacity may also be permitted. In that case, the volume assignment program P40 searches an unused volume matching the capacity and the RAID level (and/or the disk device type) specified by the user.

If the required volume does not exist in the second storage apparatus 20 (S120: No), the volume assignment program P40 transmits an alert to the user (S130), and makes the processing terminated.

This is because no unused volume of the capacity required by the user exists in the first storage apparatus 10 or in the second storage apparatus 20. Therefore, at S130, an alert message, for example, "Volume of specified capacity cannot be created. Add disk device" or others is notified to the user. The alert message is notified to the user, for example, by being displayed on the monitor display connected to the management computer 40 or by email addressed to the user.

If the required volume exists in the second storage apparatus 20 (S120: Yes), the volume assignment program P40 checks whether the second storage apparatus 20 can be connected to the first storage apparatus 10 or not.

Specifically speaking, the volume assignment program P40 transmits instructions for collecting information of the communication ports 15, 25 from the first storage apparatus 10 and the second storage apparatus 20 to the port management programs P13, P23 (S140). The information of each of the communication ports 15, 25 collected by each of the port management programs P13, P23 in each of the storage apparatuses 10, 20 is stored in the port information table T40 in the management computer 40.

If a communication port 15 of the "Used in combination" attribute exists (S150: Yes), the volume assignment program P40 confirms whether, even if the communication port 15 of the "Used in combination" attribute in the first storage apparatus 10 is externally connected, the load and the number of assigned paths are below the respective thresholds in accordance with the current load, the maximum acceptable load, and the upper limit of the maximum number of assigned paths, and makes the external volume 27A of the second storage apparatus 20 connected.

Specifically speaking, the volume assignment program P40 instructs the port management programs P13, P23 to connect the second communication port 25 to the communication port 15 of the "Used in combination" attribute which the first storage apparatus 10 comprises (S300 in FIG. 11).

Furthermore, the volume assignment program P40 instructs to connect the external volume 27A to the second communication port (S300). This makes the external volume 27A connected to the communication port 15 of the "Used in combination" attribute via the second communication port 25 and the communication network 51.

It should be noted that the second communication port 25 can be connected to the communication port 15 of the "Used in combination" attribute as long as the number of assigned paths does not exceed the maximum number of assigned paths or the TOPS does not exceed the maximum IOPS (refer to FIG. 6) of the first communication port which comprises the "Used in combination" attribute.

If no communication port 15 of the "Used in combination" attribute exists in any of the communication ports 15 in the first storage apparatus 10 (S150: No), the volume assignment program P40 transmits an instruction to the external connection program P11 for checking whether a communication port 15 of the "External" attribute exists or not.

If a communication port 15 of the "External" attribute exists (S160: Yes), the volume assignment program P40 gives instructions to the port management programs P13, P23 and make the external volume 27A connected to the communication port 15 of the "External" attribute (S290).

Specifically speaking, the volume assignment program P40 connects the second communication port 25 to the communication port 15 of the "External" attribute which the first storage apparatus 10 comprises, and further connects the external volume 27A to the second communication port 25. This makes the external volume 27A connected to the communication port 15 of the "External" attribute which the first storage apparatus 10 comprises (S290 in FIG. 11).

It should be noted that the order of S150 and S160 may also be switched. Specifically speaking, the configuration where the communication ports of the "External" attribute are processed first, and subsequently the communication ports of the "Used in combination" attribute are processed may also be permitted.

After S290 or S300, the volume assignment program P40 assigns the external connection volume 17B which is connected to the external volume 27A to the host computer as the first logical volume (S310).

The explanation returns to FIG. 10. If no communication port of the "External" attribute exists in the first communication ports 15 (S160: No), the volume assignment program P40 instructs the host management program P41 to transmit the information related to the host computers 30 (S170). The information of each of the host computers 30 collected by the host management program P41 is stored in the host information table T42.

The volume assignment program P40 instructs the host management program P41 to confirm the information of the host computers 30 connected to the first communication ports 15 (S180). For example, the volume assignment program P40 instructs to check the information related to the host computers 30 connected to the communication ports 15 in ascending order of values of the "current IOPS C404" in the port information table T40.

The volume assignment program P40 makes the host management program P41 check whether each of the host computers 30 comprises the path management program P30 or not (S190). By the value of the path management program C424 in the host information table T42, whether the host computer comprises the path management program P30 or not can be determined.

If the host computer 30 does not comprise the path management program P30 (S190: No), the volume assignment program P40 determines whether the existence/absence of the path management program P30 is checked for all the host computers 30 connected to the first communication ports 15 or not (S200). If the check is completed and none of the host computers 30 comprise the path management program P30 (S200: Yes), the volume assignment program P40 transmits an alert to the user (S220) and makes the processing terminated. This is because the communication port 15 as the current connection destination cannot be switched to the other communication port 15 if the path management program P30 does not exist.

If any host computers 30 remain unchecked (S200: NO), the volume assignment program P40 returns to the processing at S180.

If the host computers 30 comprise the path management program P30 (S190: Yes), the volume assignment program P40 selects one of the first communication ports 15 as the migration source first communication port. Furthermore, the volume assignment program P40 selects one of the other first communication ports 15 as the migration destination first communication port.

The volume assignment program P40 transmits an instruction to the port management program P13 for making the port management program P13 check whether the logical path connected to the migration source first communication port can be switched to the migration destination first communication port or not (S210).

For reconnecting the logical path to the migration destination first communication port, as long as the IOPS and the number of assigned paths do not exceed the maximum IOPS and the maximum number of assigned paths of the migration destination first communication port respectively, the connection destination of the logical path can be switched from the migration source first communication port to the migration destination first communication port. Specifically speaking, if the connection destination of the path is switched from the migration source first communication port to the migration destination first communication port, the load on the migration destination first communication port increases. The total load of the load on migration destination first communication port before the migration (migration destination load) and the load on the migration source first communication port before the migration (migration source load) is put to the migration destination first communication port. Even if the load on the migration destination first communication port increases due to the path migration, the migration destination first communication port is selected so as not to exceed the maximum IOPS of the migration destination first communication port and, at the same time, not to exceed the maximum number of assigned paths. Conversely, the management computer 40 selects the first communication port comprising the load which is equal to or smaller than a specified value as the migration source first communication port from the respective first communication ports.

If the migration destination first communication port does not exist (S210: No), the volume assignment program P40 transmits an alert to the user (S220), and terminates the processing. This is because it is impossible to generate a free communication port and change the attribute of the communication port to "External."

If a communication port to be the migration destination first communication port exists (S210: Yes), the processing proceeds to FIG. 11, and the volume assignment program P40 determines the communication port to be the migration destination first communication port (S220).

Hereinafter, S230 to S280 is the procedure of logical path migration. The volume assignment program P40 instructs the device management program P10 to connect the logical volume which is connected to the migration source first communication port to the migration destination first communication port (S230).

The volume assignment program P40 instructs the path management program P30 to switch the logical path from the migration source first communication port to the migration destination first communication port (S240).

The volume assignment program P40 instructs the device management program P10 to cancel the connection of the logical volume which is made to correspond to the migration source first communication port and the migration source first communication port (S250).

The volume assignment program P40 instructs the path management program P30 to cancel the connection of the migration source first communication port and the communication port 35 of the host computer 30 (S260). By S250 and S260, the migration source first communication port becomes a free communication port not connected to any components.

The volume assignment program P40 instructs the port management program P13 which the first storage apparatus 10 comprises to change the attribute of the migration source first communication port from "Target" to "External" (S270). At the same time, the volume assignment program P40 updates the attribute C402 of the port information table T40 to "External."

The port management program P13 which receives the instruction changes the attribute of the migration source first communication port from "Target" to "External."

The volume assignment program P40 instructs the volume management program P21 which the second storage apparatus 20 comprises to connect the external volume 27A comprising the capacity which satisfies the user's request to the second communication port 25 (S280).

The volume assignment program P40 instructs the volume management program P21 to connect the external volume 27A to the communication port 25 of the "Target" attribute and, at the same time, whose current IOPS C404 is the lowest. In simple terms, to the communication port 25 of the Target attribute and with the lowest load among a plurality of communication ports 25 which the second storage apparatus 20 comprises, the volume assignment program P40 connects the external volume 27A.

The volume management program P21 notifies the management computer 40 that the external volume 27A is connected to the communication port 25. The management computer 40 updates the value of the port C415 in the volume information table T41.

The volume assignment program P40 instructs the external connection program P12 to connect the external volume 27A to the first communication port 15 of the "External" attribute via the second communication port 25 (S290).

By the volume management program P11 which the first storage apparatus 10 comprises, an ID is provided to the connected external logical volume 27A. Furthermore, the volume management program P11 adds information to the external port ID C104 in the external connection information table T10.

The volume assignment program P40 assigns the external connection volume 17B to the host computer 30 as the first logical volume which the first storage apparatus 10 comprises (S310).

If a command is issued from the host computer 30 to the external connection volume 17B, this makes the first storage apparatus 10 convert the command into a command addressed to the second storage apparatus 20 and transfer the same to the second storage apparatus 20. The second storage apparatus 20 reads or writes the data from or to the external volume 27A in accordance with the command received from the first storage apparatus 10, and transmits the same to the first storage apparatus 10.

It should be noted that the above-mentioned processing can be performed even if the second storage apparatus 20 does not comprise the external connection program P22 and the external connection information T20. This is because the first storage apparatus 10 leads the command processing.

As described above, according to this embodiment, if the first storage apparatus 10 does not comprise a communication port which can be connected to the second storage apparatus 20 which is an external storage apparatus, it is possible to change the attribute of the communication port 15 which is selected as the migration source and connect the same to the external volume 27A.

In this embodiment, a smaller number of paths than the maximum number of assigned paths is assigned and, at the same time, a communication port 15 which does not reach the maximum IOPS is selected as a migration destination communication port. Therefore, even if the logical path is reconnected from the migration source communication port to the migration destination communication port, I/O commands from the host computer 30 can be processed without trouble.

Embodiment 2

The Embodiment 2 is explained with reference to Figures from 12 to 17. The embodiments below including this embodiment are equivalent to the variations of the Embodiment 1. Therefore, in the embodiments below, the differences from the Embodiment 1 are mainly explained. In this embodiment, the case where a volume is added to a pool 19 for assigning the storage area to a virtual volume (refer to FIG. 13) is explained as an example.

Figure 12:
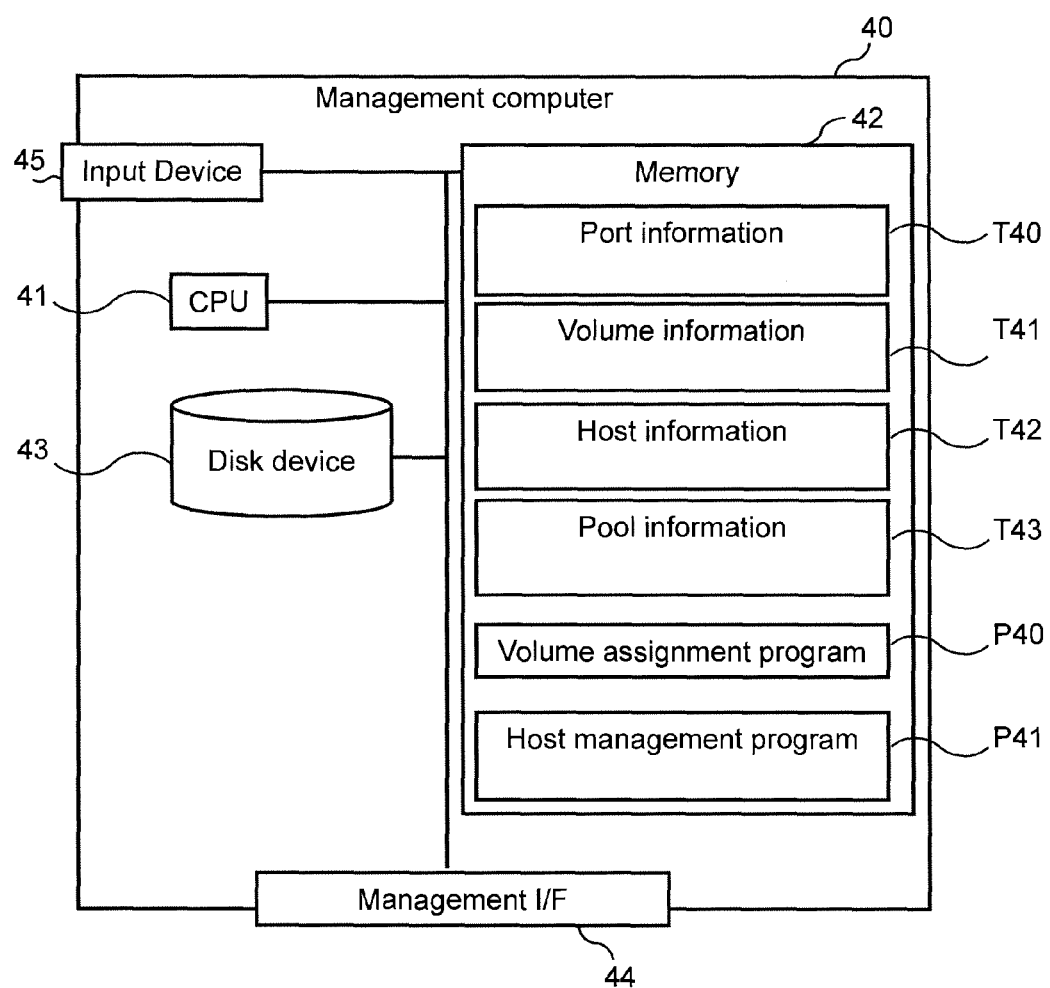
FIG. 12 shows the configuration of the management computer related to the Embodiment 2.

FIG. 12 shows the configuration of a management computer 40 related to the Embodiment 2. In the memory 42 of the management computer 40 in the Embodiment 2, pool information T43 is stored. The pool information T43 is managed by the management computer 40.

FIG. 13 shows the configuration of the pool information table T43. The pool information table T43 comprises the information related to all the pools 19 managed in the first storage apparatus 10. The pool information table T43, for example, manages a number of pool volumes C431, a total capacity C432, a usage rate C433, and a threshold C434 per pool ID C430 by making the same correspond to one another.

The pool ID C430 is the information for identifying each of the pools 19. The number of pool volumes C431 is the information indicating the number of pool volumes (logical volumes) configuring each of the pools.

The total capacity C432 is the information indicating the total capacity of each of the pools. The usage rate C433 is the information indicating the currently used rate of the total capacity C432 of each of the pools. The threshold C434 is the information indicating the upper limit value of the usage rate of each of the pools.

Figure 14:
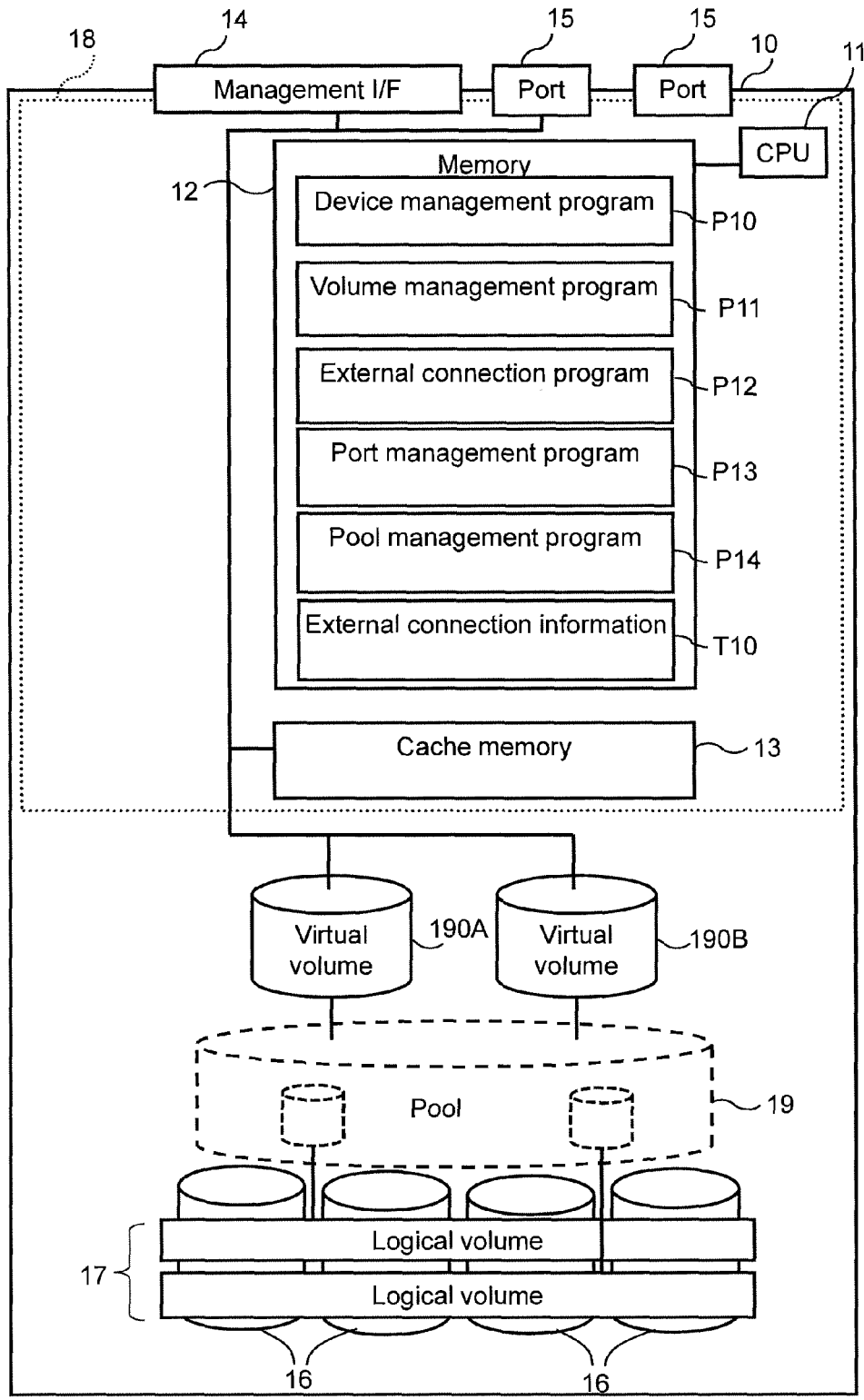
FIG. 14 shows the configuration of the first storage apparatus 10.
Figure 15:
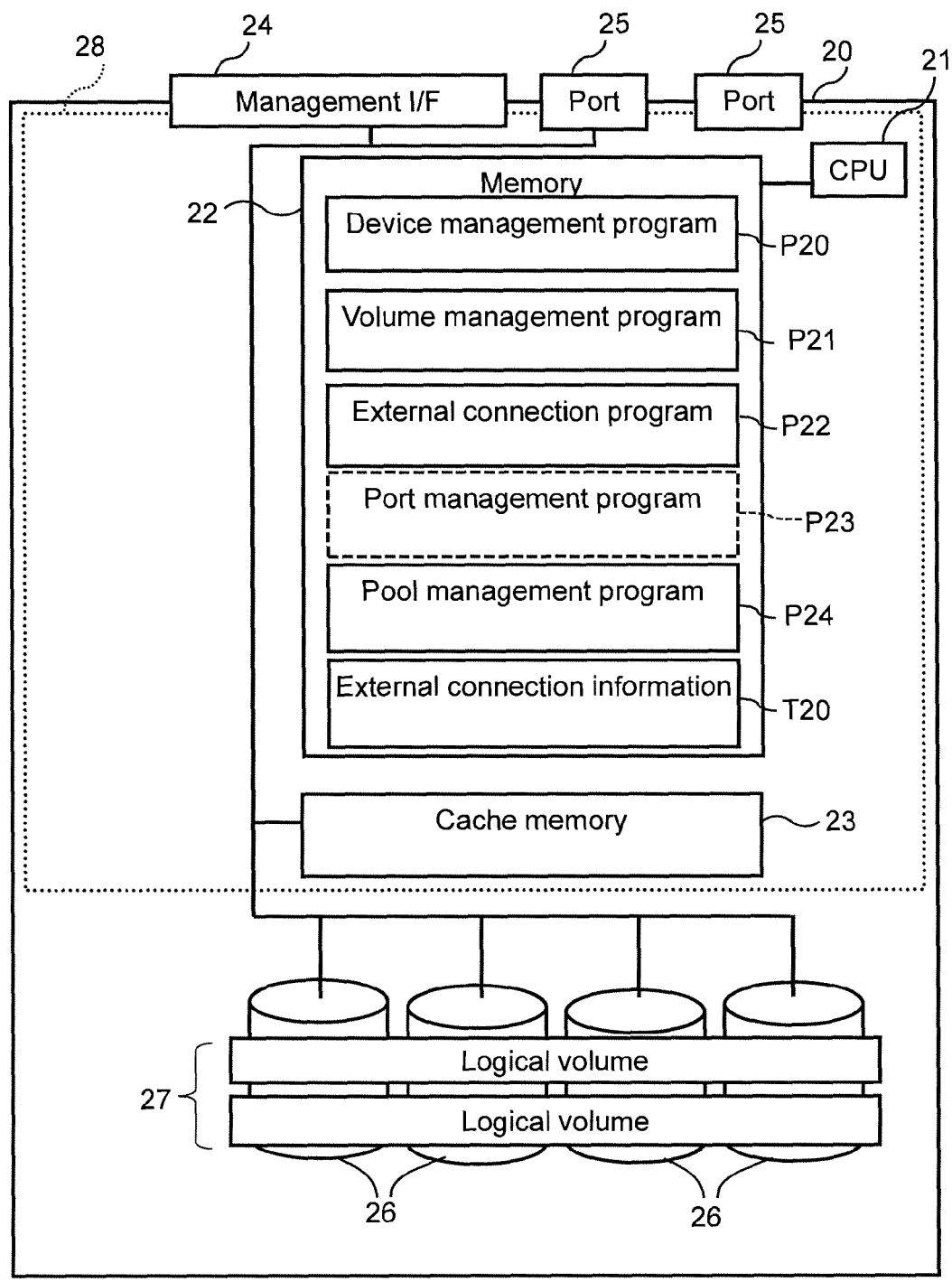
FIG. 15 shows the configuration of the second storage apparatus 20.

FIG. 14 shows the configuration of the first storage control apparatus 10. FIG. 15 shows the configuration of the second storage apparatus 20.

In the memory 12 (22) related to the Embodiment 2 which the first storage apparatus 10 and the second storage apparatus 20 comprise, a pool management program P24 for managing the pools 19 is stored. In this embodiment, the case where a logical volume 27 (external volume) of the second storage apparatus 20 is added to the pool 19 in the first storage apparatus 10 is explained. Therefore, the second storage apparatus 20 does not have to comprise the pool management program P24. Hereinafter, the pool management program P14 of the first storage apparatus 10 is mainly explained.

The first storage apparatus 10 assigns virtual volumes 190A, 190B to the host computer 30. If not specifically distinguished, the virtual volumes 190A, 190B are referred to as virtual volumes 190. Each of the virtual volumes 190 is generated in accordance with the pool 19. The pool 19 is created by the first logical volumes (the internal volume 17A and the external connection volume 17B) which the first storage apparatus 10 manages. Though FIG. 14 shows one pool 19, a plurality of pools may also be set.

The virtual volume 190 is a logical volume which is virtually generated. When the virtual volume 190 is originally generated, only the information of the volume size, the LUN and others is defined. If the host computer 30 writes the data to the virtual volume 190, the actual storage area in the pool 19 (actual page) is assigned to the area including the write destination address (virtual page). The write data from the host computer 30 is stored in the actual storage area assigned to the virtual volume 190. The actual storage area of the pool 19 is provided from one or a plurality of volumes configuring the pool 19. The volumes configuring the pool 19 are referred to as pool volumes. By adding an unused volume to the pool 19, the total capacity of the pool 19 can be increased and, at the same time, the usage rate can be reduced.

The pool management program P14 collects the information related to each of the pools 19. The information related to each of the pools 19 which is collected by the pool management program P14 is stored in the pool information T43. In addition to this, the pool management program P14, for example, performs the processing of creating and deleting the pool 19 and adding pool volumes, and updates the pool information table T43 in accordance with those types of processing. Furthermore, as described above, the pool management program P14 transmits I/O commands issued from the host computer 30 for the virtual volume 190 to the corresponding pool volume.

FIG. 15 shows the configuration of the second storage apparatus 20. The second storage apparatus 20 in this embodiment does not have a pool. However, the second storage apparatus 20 may also comprise a pool.

Figure 16:
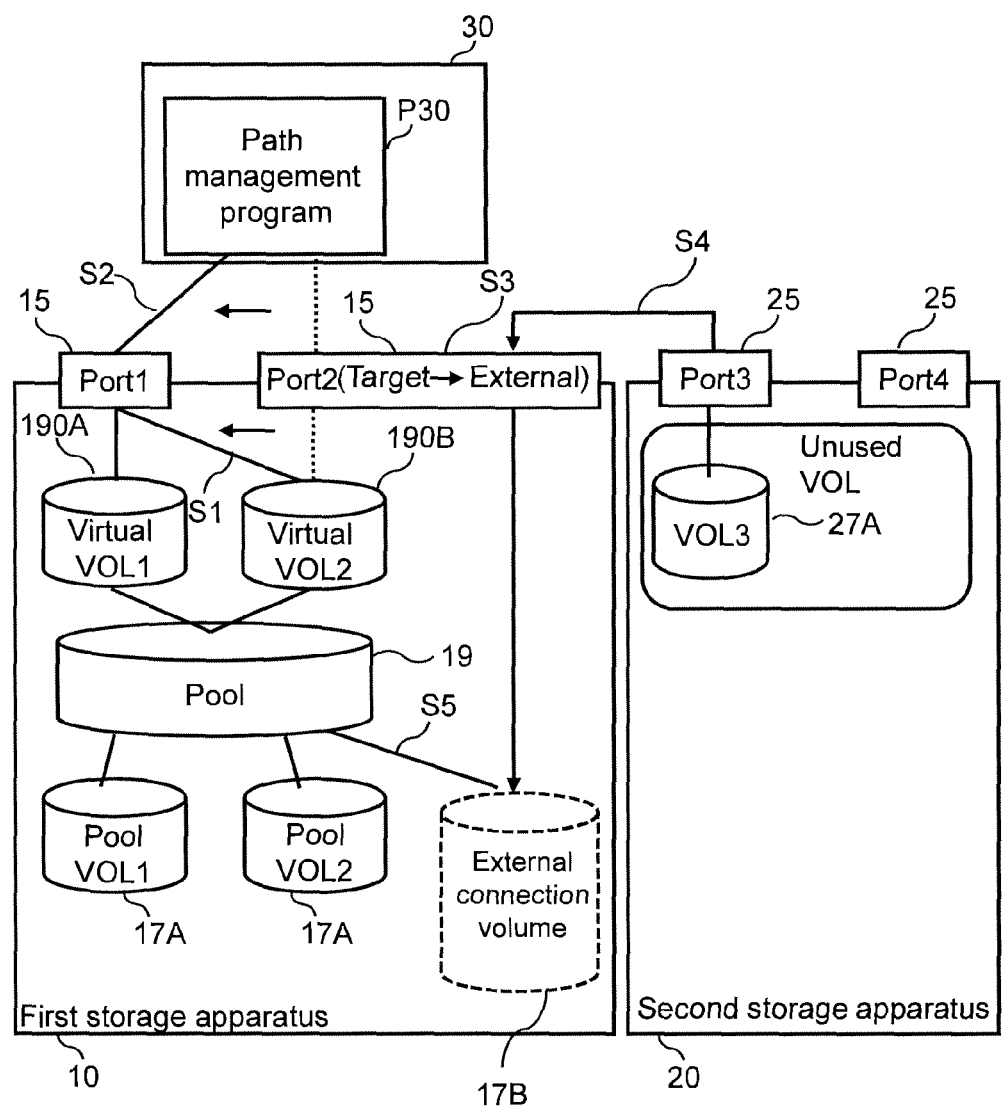
FIG. 16 is a pattern diagram showing the overview of the processing of the storage system.

FIG. 16 is a pattern diagram which shows the overview of the processing of the storage system. Firstly, the first storage apparatus 10 creates a pool 19 of two logical volumes 17A. In accordance with the pool 19, virtual volumes 190 are created. Each of the virtual volumes 190 is connected to the host computer 30 via the communication ports 15.

One of the virtual volumes 190A is connected to the host computer 30 via a communication port 15 indicated by "Port1." The other logical volume 190B is connected to the host computer 30 via the other communication port 15 indicated by "Port2." The communication port 35 of the host computer 30 is the Initiator port. Each of the communication ports "Port1," "Port2" in the first storage apparatus 10 is the Target port.

If the free capacity of the pool 19 becomes scarce, the user can add pool volumes to the pool 19. If an unused actual volume 17A exists in the first storage apparatus 10, the user has only to add the unused actual volume 17A to the pool 19. If no unused actual volume 17A exists in the first storage apparatus 10 and on other cases, it is possible to add a volume which the external storage apparatus 20 comprises to the pool.

The user gives an instruction to the first storage apparatus 10 via the management computer 40, and makes an external connection volume 17B created in the first storage apparatus 10.

If the external volume 27A which the second storage apparatus 20 comprises can be connected to the external connection volume 17B, a new pool volume can be created in the first storage apparatus 10.

However, the two communication ports 15 (Port1), 15 (Port2) which the first storage apparatus 10 comprises are already used by the host computer 30. In FIG. 16, no free communication port to be used for the connection between the external connection volume 17B and the external volume 27A is supposed to exist.

Therefore, the management computer 40 selects one communication port 15 (Port2) to be the migration source from a plurality of communication ports 15 (Port1), 15 (Port2) which are in use. Furthermore, the management computer 40 selects the other communication port 15 (Port1) as the migration destination communication port.

The first storage apparatus 10, in accordance with the instruction from the management computer 40, switches the connection destination of the virtual volume 190B (Virtual Vol2) from the migration source communication port 15 (Port2) to the migration destination communication port 15 (Port1) (S1).

The path management program P30 of the host computer 30 switches the connection destination of the communication port 35 of the host computer 30 from the migration source communication port 15 (Port2) to the migration destination communication port 15 (Port1) (S2).

This makes the migration source communication port 15 (Port2) unused. The communication port 15 (Port2) becomes a free communication port which is not connected to any components.

The management computer 40 gives an instruction to the first storage apparatus 10 and makes the attribute of the communication port 15 (Port2) which became the free communication port changed from "Target" to "External" (S3). This makes the communication port 15 (Port2) available for external connection.

The management computer 40, by giving an instruction to each of the first storage apparatus 10 and the second storage apparatus 20, makes the communication port 15 (Port2) comprising the "External" attribute of the first storage apparatus 10 connected to the communication port 25 (Port3) of the second storage apparatus 20 (S4).

The management computer 40 gives an instruction to the second storage apparatus 20 and makes the unused external volume 27A which the second storage apparatus 20 manages connected to the communication port 25 (Port3) (S5). This makes the external connection volume 17B connected to the external volume 27A via the communication port 15 (Port2), the communication network 51, and the communication port 25 (Port3). The pool management program P14 adds the external connection volume 17B to the pool 19 in the first storage apparatus 10.

Figure 17:
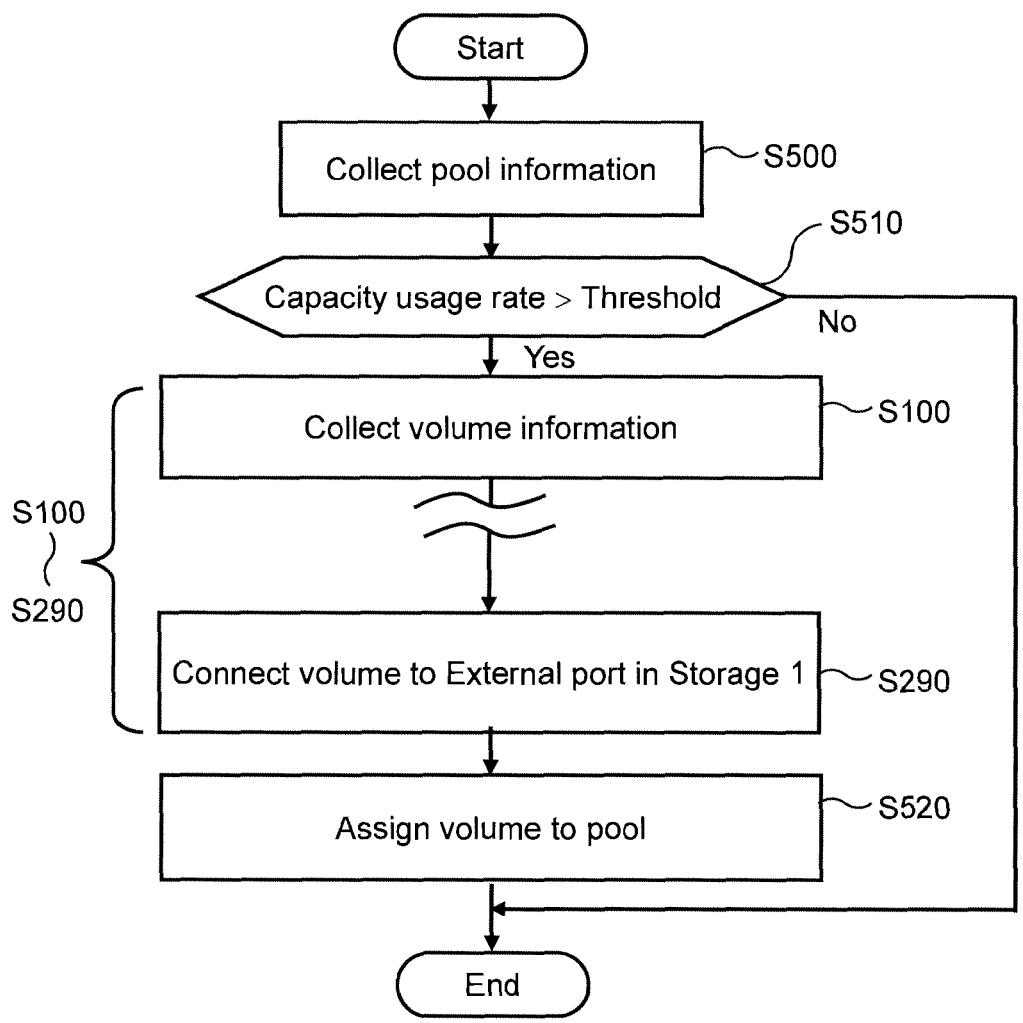
FIG. 17 is a flowchart showing the processing of assigning an external volume to a pool in the first storage control apparatus.

FIG. 17 is a flowchart showing the processing of assigning the external volume 17B to the pool 19 in the first storage control apparatus 10. The flowchart shown in FIG. 17 comprises the same steps from S100 to S290 as the flowchart shown in FIG. 10 and FIG. 11. Furthermore, this processing comprises new steps, S500, S510, and S520. In this processing, the case where pool volumes are automatically added in accordance with the usage status of the pool 19 is explained. It may also be permitted to add pool volumes to the pool 19 triggered by the instruction from the user.

Firstly, the volume assignment program P40 instructs the pool management program P14 which the first storage apparatus 10 comprises to collect the information related to the pool 19 (S500). The information related to the pool 19 collected by the pool management program P14 is stored in the pool information table T43.

The volume assignment program P40 compares the pool capacity usage rate (usage rate C433) with the threshold (C434) (S510). If the usage rate C433 does not exceed the threshold C434 (S510: No), it is not necessary to add a volume to the pool 19, and therefore the volume assignment program P40 makes the processing terminated.

If the usage rate C433 exceeds the threshold C434 (S510: Yes), it is necessary to assign a new volume to the pool 19. Therefore, the volume assignment program P40 performs the above-mentioned processing from S100 to S290. By the processing from S100 to S290, it is possible to create a communication port for the connection to the second storage apparatus 20 in the first storage apparatus 10 and connect the external volume 27A to the external connection volume 17B.

The volume assignment program P40 instructs the volume management program P11 of the first storage apparatus 10 to assign the external connection volume 17A to the pool 19 (S520). The volume assignment program P40 updates the respective values (C432 to C434) related to the pool 19 of the pool information table T43 (S520).

This embodiment which is configured as described above also has the same effect as the Embodiment 1. In this embodiment, if the usage rate of the pool 19 exceeds the threshold, an external connection volume 17B is added to the pool 19. Even if no communication port that can be connected to the external storage apparatus 20 exists in the first storage apparatus 10, the attribute of the first communication port 15 is changed as described in the Embodiment 1, and the first communication port 15 and the second communication port 25 can be connected. By this method, external volumes 27A can be added to the pool 19 via virtual external connection volume 17B.

Embodiment 3

Figure 18:
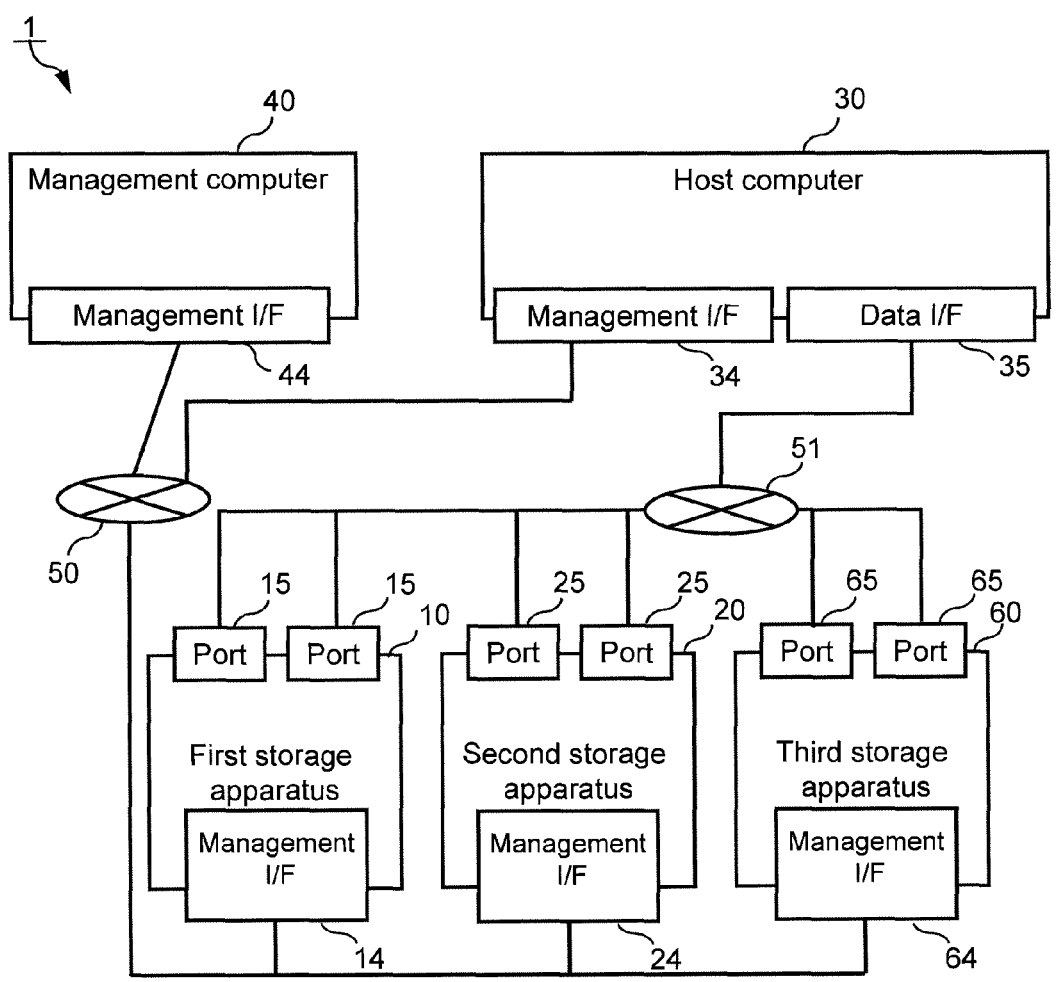
FIG. 18 shows the configuration of the computer system including the storage system related to the Embodiment 3.

The Embodiment 3 is explained below with reference to Figures from 18 to 21. FIG. 18 shows the configuration of a computer system including a storage system. The storage system 1 related to this embodiment comprises three storage apparatuses 10, 20, and 60. The management I/F 44 of the management computer 40 is connected to the management I/Fs 14, 24, and 64 of the respective storage apparatuses 10, 20, and 60 via the management network 50.

The second storage apparatus 20 is already connected to the first storage apparatus 10. As needed, the third communication port 65 of the third storage apparatus 60 is connected to the second communication port 25 of the second storage apparatus 20. In this embodiment, the volume which the third storage apparatus 60 comprises is connected to the external connection volume in the first storage apparatus 10 via the second storage apparatus 20.

It should be noted that, though this embodiment is described as a variation of the Embodiment 1, not limited to this, this embodiment may also be configured as a variation of the Embodiment 2. Specifically speaking, the configuration where the volume of the third storage apparatus 60 is added to the pool 19 in the first storage apparatus 10 via the second storage apparatus 20 may also be permitted.

Figure 19:
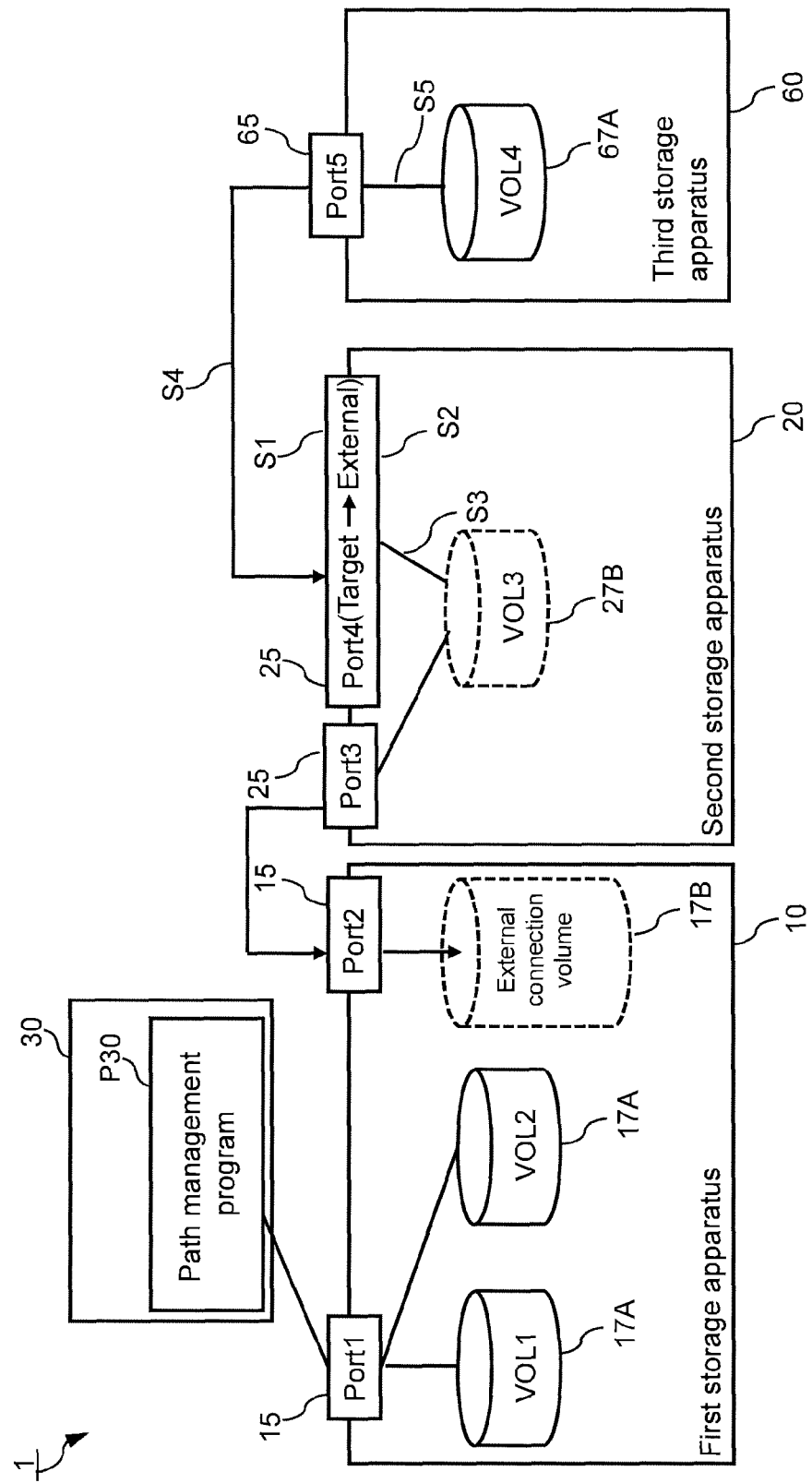
FIG. 19 is a pattern diagram showing the overview of the processing of the storage system.

FIG. 19 is a pattern diagram showing the overview of the processing of the storage system 1. The second storage apparatus 20 comprises a virtual logical volume 27B. The third storage apparatus 60 comprises a logical volume 67A. This logical volume 67A is generated in accordance with the disk device which the third storage apparatus 60 comprises (not shown in the figure).

The communication port 15 (Port2) which the first storage apparatus 10 comprises is connected to the communication port 25 (Port3) which the second storage apparatus 20 comprises. The logical volume 27B of the second storage apparatus 20 is connected to the external connection volume 17B via the communication port 25 (Port3) and the communication port 15 (Port2).

The second storage apparatus 20, in accordance with the instruction from the management computer 40, makes any one of the second communication ports 25 (Port3, Port4) which the second storage apparatus 20 comprises a free communication port (S1). At this point, the communication port (Port4) is made a free communication port.

The management computer 40 gives an instruction to the second storage apparatus 20 and makes the attribute of the free communication port 25 (Port4) changed from "Target" to "External" (S2). This makes it possible to connect the other storage apparatus 60 to the second storage apparatus 20.

If the second storage apparatus 20 is seen from the first storage apparatus 10, the second storage apparatus 20 is an external storage apparatus. If the third storage apparatus 60 is seen from the second storage apparatus 20, the third storage apparatus 60 is an external storage apparatus.

The management computer 40 gives an instruction to the second storage apparatus 20 and makes the logical volume 27B connected to the communication port 25 (Port4) of the "External" attribute (S3).

The management computer 40, by giving an instruction to each of the second storage apparatus 20 and the third storage apparatus 60, makes the communication port 25 (Port4) comprising the "External" attribute to the communication port 65 (Port5) of the third storage apparatus 60 (S4).

The management computer 40 gives an instruction to the third storage apparatus 60 and makes the logical volume 67A connected to the third communication port 65 (Port5) (S5).

As described above, by the processing from S1 to S5, the logical volume 67A of the third storage apparatus 60 is connected to the virtual logical volume 27B of the second storage apparatus 20 via the communication port 65 (Port5), the communication network 51, and the communication port 25 (Port4).

Furthermore, the virtual logical volume 27B is connected to the external connection volume 17B via the communication port 25 (Port3), the communication network 51, and the communication port (Port2).

By this method, the first storage apparatus 10 can utilize the logical volume 67A which the third storage apparatus 60 comprises as the first logical volume managed by the first storage apparatus 10. The first storage apparatus 10 can assign the logical volume 67A as the first logical volume to the host computer 30. As explained in the Embodiment 2, the first storage apparatus 10 can also add the logical volume 67A of the third storage apparatus 60 to the pool 19.

Figure 20:
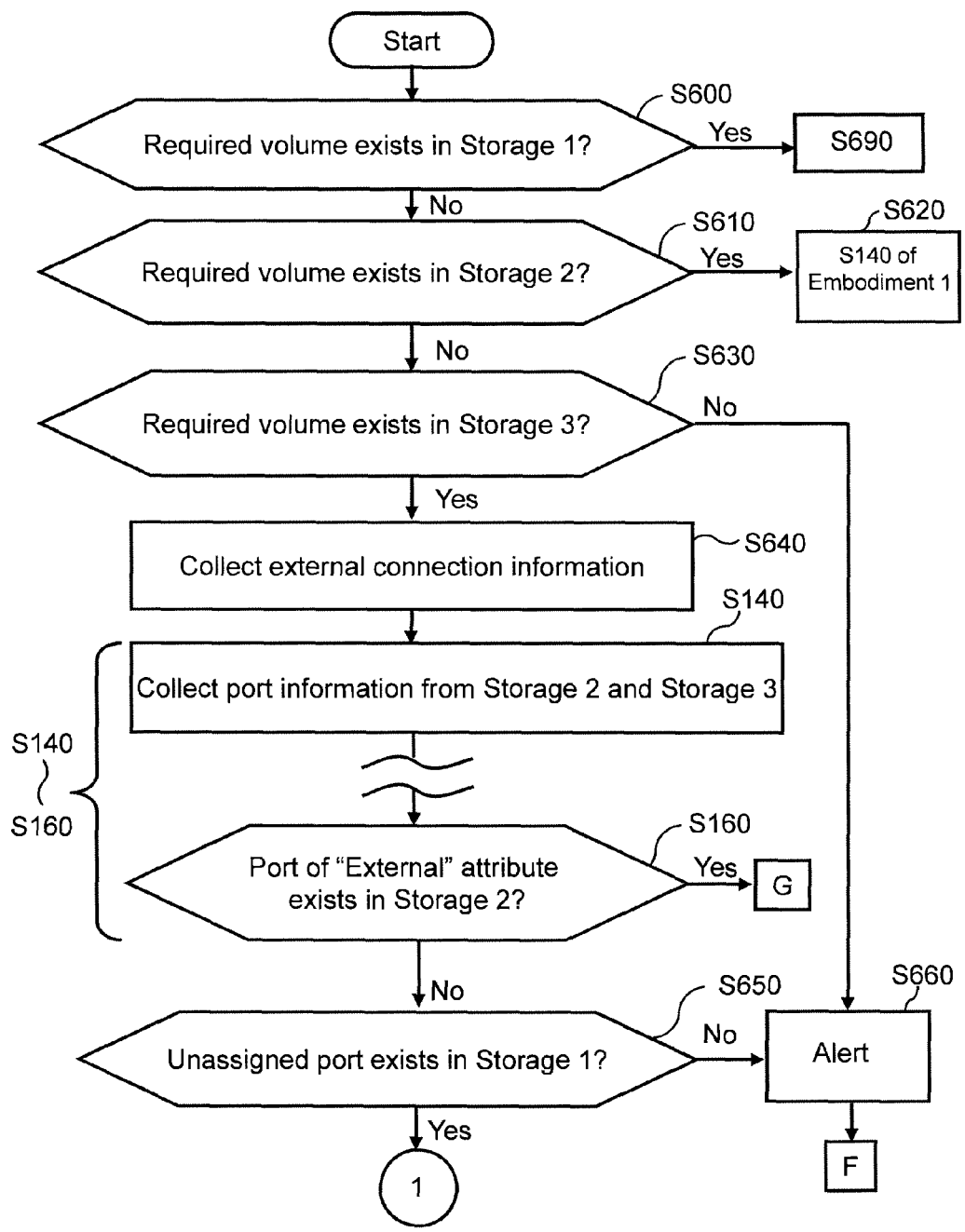
FIG. 20 is a flowchart showing the processing of assigning an external volume to the host computer.
Figure 21:
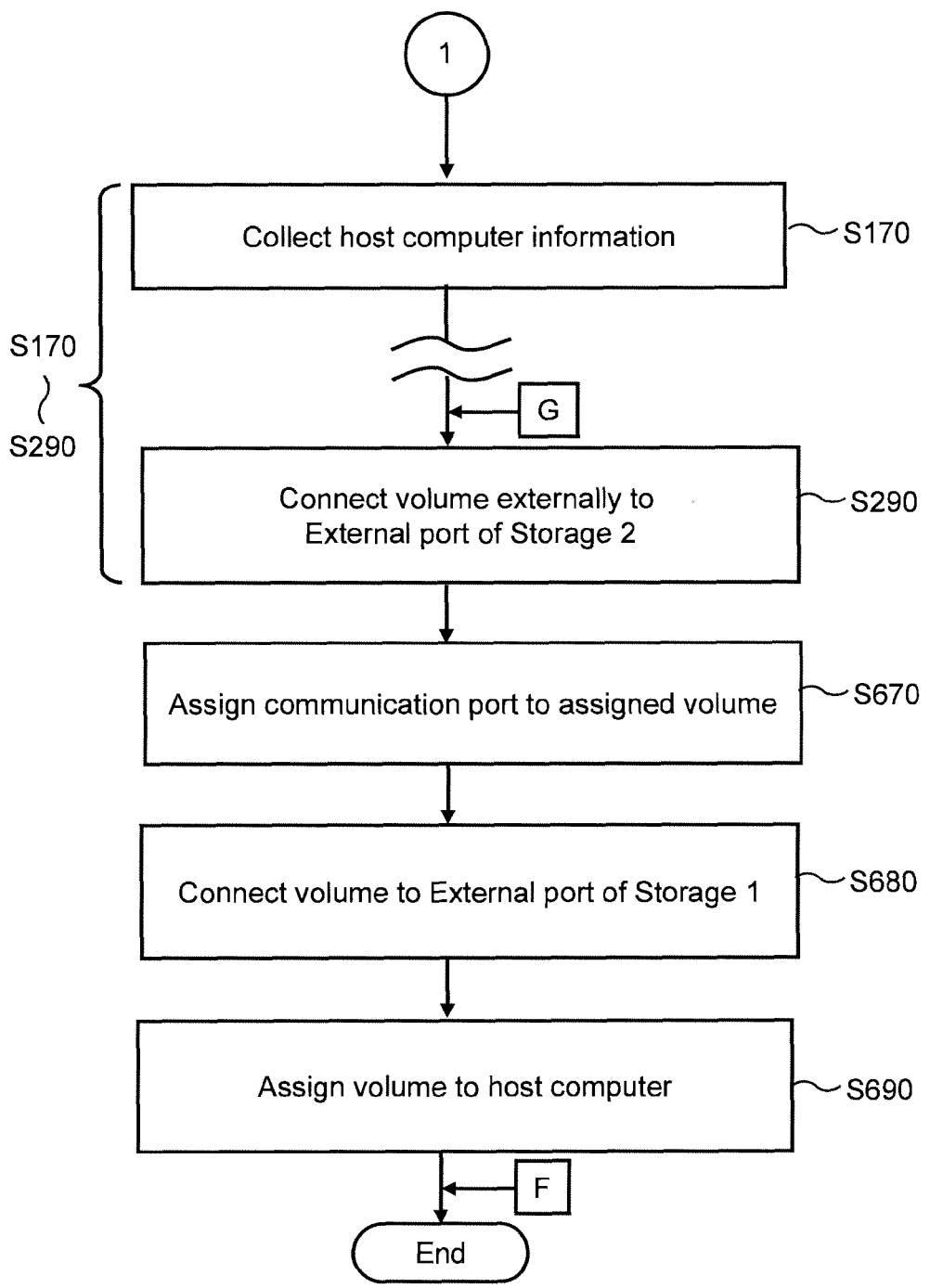
FIG. 21 is a flowchart following FIG. 19.

FIG. 20 and FIG. 21 are the flowcharts showing the processing of assigning an external volume to the host computer 30. The flowchart shown in FIG. 20 and FIG. 21 comprise the same steps (S140 to S160, S170 to S290) as the flowcharts shown in the Embodiment 1 (FIG. 10 and FIG. 11). Furthermore, in this processing, the flowcharts comprise new steps (S600 to S690).

The volume assignment program P40 determines whether the volume required by the user exists in the first storage apparatus 10 or not (S600). At this point, for convenience, the unused volume of the capacity required by the user is referred to as a specified unused volume.

If the specified unused volume exists in the first storage apparatus 10 (S600: Yes), the volume assignment program P40 assigns the unused volume to the host computer 30 (S690 in FIG. 21).

If the specified unused volume does not exist in the first storage apparatus 10 (S600: No), the volume assignment program P40 determines whether the specified unused volume exists in the second storage apparatus 20 or not (S610).

If the specified unused volume exists in the second storage apparatus 20 (S610: Yes), the volume assignment program P40 proceeds to the same processing as S140 in the Embodiment 1 (S620). If the first storage apparatus 10 utilizes the unused volume in the second storage apparatus 20, the same processing as the Embodiment 1 has only to be performed.

If the specified unused volume does not exist in the second storage apparatus 20 either (S610: No), the volume assignment program P40 confirms whether the specified unused volume exists in the third storage apparatus 60 or not (S630).

If the specified unused volume does not exist in the third storage apparatus 60 either (S630: No), the volume assignment program P40 transmits an alert to the user (S660), and terminates the processing.

If the specified unused volume exists in the third storage apparatus 60 (S630: Yes), the volume assignment program P40 instructs the external connection program P12 of the first storage apparatus 10 to collect the external connection information from the second storage apparatus 20 and the third storage apparatus 60 respectively (S640). The collected external connection information is stored in the external connection information table T10 by the external connection program P12.

Subsequently, the volume assignment program P40 performs the flowchart from S140 to S160 of the Embodiment 1. Though the processing of the flowchart from S140 to S160 is performed for the first storage apparatus 10 and the second storage apparatus 20 in the Embodiment 1, this processing is performed for the second storage apparatus 20 and the third storage apparatus 60 in this embodiment. If no communication port 25 of the "External" attribute exists in the second storage apparatus 20 (S160: No), the volume assignment program P40 proceeds to the processing at S650.

If a communication port 25 of the "External" attribute exists in the second storage apparatus 20 (S160: Yes), the volume assignment program P40 proceeds to S290 in FIG. 21. The volume assignment program P40 connects the logical volume 67A of the third storage apparatus 60 to the communication port 25 of the "External" attribute (S290).

The volume assignment program P40 instructs the port management program P23 to confirm whether an unassigned communication port exists among the communication ports 15 of the first storage apparatus 10 or not (S650).

If no unassigned communication port 15 exists in the first storage apparatus 10 (S650: No), the volume assignment program P40 transmits an alert to the user (S660), and terminates the processing.

If an unassigned communication port exists (S650: Yes), the volume assignment program P40 performs the above-mentioned processing from S170 to S290. By the processing from S170 to S290, any one of the communication ports 25 of the second storage apparatus 20 becomes a free communication port. Furthermore, the logical volume 67A of the third storage apparatus 60 and the virtual logical volume 27B of the second storage apparatus 20 are connected via the third communication port 65 (Port5), the communication network 51, and the second communication port 25 (Port4) (S290). The volume assignment program P40 proceeds to S670 after S290.

The volume assignment program P40 instructs the volume management program P21 of the second storage apparatus 20 to assign the virtual logical volume 27B to which the logical volume 67A is connected to the second communication port 25 which is already connected to the first storage apparatus 10 (S670).

The volume assignment program P40 instructs the external connection program P12 of the first storage apparatus 10 to assign the logical volume 27B to which the logical volume 67A is connected to the first communication port 15 of the "External" attribute which is already connected to the second storage apparatus 20 (S680). This makes the logical volume 67A of the third storage apparatus 60 connected to the logical volume 17A of the first storage apparatus 10 via the logical volume 27B of the second storage apparatus 20.

The volume assignment program P40 instructs the volume management program P11 of the first storage apparatus 10 to provide an ID to the logical volume 67A of the third storage apparatus 60. This is performed, for example, by updating the external volume ID C103 in the external connection information table T10.

The volume assignment program P40 instructs the volume management program P11 of the first storage apparatus 10 to assign the external connection volume 17B to which the logical volume 67A is assigned to the communication port 15 of the "Target" attribute. Furthermore, the volume assignment program P40 instructs the path management program P30 to connect the logical path to the communication port 15 of the "Target" attribute (S690).

If a command is issued from the host computer 30 to the external connection volume 17B, the first storage apparatus 10 converts the command into a command whose target is the virtual volume 27B in the second storage apparatus 20. The first storage apparatus 10 transmits the command to the second storage apparatus 20. The second storage apparatus 20 converts the command received from the first storage apparatus 10 into a command whose target is the logical volume 67A of the third storage apparatus 60. The second storage apparatus 20 transmits the same to the third storage apparatus 60. The result of the processing for the logical volume 67A is returned from the third storage apparatus 60 to the first storage apparatus 10 via the second storage apparatus 20.

In this embodiment, as the Embodiment 1, after the path is migrated to the other communication port, the attribute of the migration source communication port is changed. This makes the logical volume 67A which the changed third storage apparatus 60 comprises connected to the first storage apparatus 10 via the second storage apparatus 20.

Though the embodiments are explained as above, these are only explanatory examples for the present invention, and it is not intended to limit the scope of the present invention to the embodiments. Specifically speaking, the present invention may be put into practice by combining the respective embodiments appropriately.

The Embodiment 2 can be explained as below, for example.

"Aspect 1. A storage system which comprises a first storage control apparatus comprising a first controller which receives a command from the host computer via the first communication port and processes the same,
a second storage control apparatus comprising a second controller which comprises a second communication port, and
a management computer comprising a memory and a processor which performs the processing in accordance with information stored in the memory and manages the first storage control apparatus and the second storage control apparatus,
and the storage system in which the first controller manages a pool including one or more pool volumes, creates a virtual logical volume in accordance with the pool, and assigns the virtual logical volume to the host computer via the first communication port, wherein, in case a second logical volume managed in the second storage control apparatus is associated with the first storage control apparatus,
the management computer
(A) selects a migration source first communication port from the first communication ports,
(B) selects a migration destination first communication port from the first communication ports,
(C) changes the path connected to the migration source first communication port to the migration destination first communication port and furthermore makes the migration source first communication port a free communication port,
(D) changes the attribute of the free communication port to a specified attribute by which the connection with the second communication port is possible,
(E) connects the second logical volume to the free communication port via the second communication port,
(F) and makes the second logical volume which is connected to the free communication port assigned as the pool volume to the pool.

Aspect 2. The storage system described in the Aspect 1 wherein the management computer performs the processing of (A), (B), (C), (D), (E), and (F) triggered by the instruction from the host computer.

Aspect 3. The storage system described in the Aspect 1 wherein the management computer performs the processing of (A), (B), (C), (D), (E), and (F) if the free capacity of the pool becomes equal to or below a specified threshold."

The Embodiment 3 may also be expressed as below.

"A storage system which includes
a first storage control apparatus comprising a first controller which comprises a first communication port and processes a command from the host computer via the first communication port,
a second storage control apparatus comprising a second controller which comprises a second communication port,
a third storage control apparatus comprising a third controller which comprises a third communication port,
and a management computer comprising a memory and a processor which performs the processing in accordance with information stored in the memory and manages the first storage control apparatus, the second storage control apparatus, and the third storage control apparatus, wherein, in case the first storage control apparatus and the second storage control apparatus are connected
and the third logical volume managed in the third storage control apparatus is associated with the virtual first logical volume managed by the first storage control apparatus via the virtual second logical volume managed by the second storage control apparatus,
the management computer
(A) selects a migration source second communication port from the second communication ports,
(B) selects a migration destination second communication port from the second communication ports,
(C) transmits an instruction to change the connection destination of the path connected to the migration source second communication port to the migration destination communication port and makes the migration source second communication port a free communication port, (E) changes the attribute of the free communication port changed to a attribute by which the connection with the third communication port is possible, (F) and makes the third logical volume connected to the third communication port and furthermore makes the free communication port whose attribute was changed connected to the third communication port, and assigns the third logical volume as a first logical volume managed by the first storage control apparatus to the host computer via the second logical volume.

In the Embodiment 3, if necessary, in the first storage apparatus 10, it may also be permitted to migrate the path from the migration source communication port to the migration destination communication port and, at the same time, change the attribute of the migration source communication port to "External."

REFERENCE SIGNS LIST

10: First storage apparatus, 20: Second storage apparatus, 30: Host computer, 40: Management computer, 60: Third storage apparatus

The invention claimed is:

1. A storage system, comprising:
a first storage control apparatus comprising a first controller, a plurality of first communication ports, and a plurality of first logical volumes; wherein the first storage control apparatus is configured to receive an I/O command for any of the plurality of first communication ports connected to a host computer using a network, the plurality of first logical volumes connected to each of the plurality of first communication ports, and the plurality of first logical volumes from the host computer using the plurality of first communication ports, and to process this command;
a second storage control apparatus comprising a second controller, which is configured to receive an I/O command for one or more second communication ports and one or more second logical volumes and to process this command; and
a management computer, which comprises a memory and a processor configured to perform processing based on information stored in the memory, and which is configured to manage the first storage control apparatus and the second storage control apparatus,
wherein, the management computer
comprises a volume assignment unit configured to:
(A) make the first storage control apparatus prepare an external connection volume as a new first logical volume;
(B) make the second storage control apparatus set one of the one or more second logical volumes on an external volume and connect the external volume to one of the one or more second communication ports;
(C) determine whether a first communication port is connected to one of the one or more second communication ports among the plurality of first communication ports;
(D) select a migration source first communication port from the plurality of first communication ports when a first communication port, which can be connected to one of the one or more second communication ports, does not exist;

(E) select a migration destination first communication port from the plurality of first communication ports;
(F) make the first storage control apparatus connect a first logical volume connected to the migration source first communication port to the migration destination first communication port and make the first storage control apparatus cancel connection between the first logical volume and the migration source first communication port;
(G) make the host computer switch a logical path for the first logical volume from the migration source first communication port to the migration destination first communication port and make the host computer cancel connection with the migration source first communication port;
(H) make the first storage control apparatus change an attribute of the migration source first communication port, which is a free communication port to a specified attribute that makes it possible to connect to the second communication port;
(I) make the first and second storage control apparatuses connect one of the one or more second communication ports to the migration source first communication port, thereby connecting the external volume to the migration source first communication port; and
(J) make the first storage control apparatus connect the external connection volume to the migration source first communication port; and
is configured to assign the external volume to the host computer as a first logical volume managed by the first storage control apparatus using the migration source first communication port, whose attribute has been changed to the specified attribute.

2. A storage system according to claim 1, wherein the volume assignment unit of the management computer, in a case where a first communication port, which can be connected to one of the one or more second communication ports among the plurality of first communication ports, exists, is configured not to perform the processing of (D), (E), (F), (G), and (H) and to perform the processing of (I) and (J).

3. A storage system according to claim 1, wherein the memory of the management computer is configured to store host management information for indicating whether or not the host computer comprises a path management program for managing a connection destination of a logical path for the plurality of first logical volumes, and
the volume assignment unit of the management computer is configured to:
in (D), select the migration source first communication port from the one or more first communication ports connected to the host computer comprising the path management program, and
in (G), make the migration source first communication port the free communication port by using the path management program to change the connection destination of the logical for the first logical volume from the migration source first communication port to the migration destination first communication port.

4. A storage system according to claim 1, wherein the memory of the management computer is configured to store port management information indicating each load on each of the plurality of first communication ports, and
the management computer is configured to:
in (D), select the migration source first communication port from one or more first communication ports having loads of equal to or smaller than a pre-set specified value of each of the plurality of first communication ports.

5. A storage system according to claim 4, wherein the port management information manages current load, maximum acceptable load, and a maximum number of assigned paths for each of the plurality of communication ports, and
the management computer is configured to:
in (E), in a case where the first logical volume that has been connected to the migration source first communication port is reconnected to the migration destination first communication port, select the migration destination first communication port such that the load of the migration destination first communication port is equal to or smaller than maximum acceptable load set for the migration destination first communication port.

6. A storage system according to claim 1, wherein the specified attribute is an External attribute for connecting the external volume of the second storage control apparatus to the external connection volume of the first storage control apparatus so that the external logical volume is used as the first logical volume of the first storage control apparatus.

7. A storage system according to claim 6, wherein the specified attribute includes an initiator attribute in addition to the External attribute.

8. A method for managing a storage system,
wherein the storage system comprises:
a first storage control apparatus comprising a first controller, a plurality of first communication ports, and a plurality of first logical volumes; wherein the first storage control apparatus is configured to receive an I/O command for any of the plurality of first communication ports connected to a host computer using a network, the plurality of first logical volumes connected to each of the plurality of first communication ports, and the plurality of first logical volumes from the host computer using the plurality of first communication ports, and to process this command;
a second storage control apparatus comprising a second controller, which is configured to receive an I/O command for one or more second communication ports and one or more second logical volumes and to process this command; and
a management computer, which comprises a memory and a processor configured to perform processing based on information stored in the memory, and which is configured to manage the first storage control apparatus and the second storage control apparatus and to assign the external volume to the host computer as a first logical volume managed by the first storage control apparatus using the migration source first communication port, whose attribute has been changed to the specified attribute;
wherein the management method comprises using the management computer in the steps of:
(A) making the first storage control apparatus prepare an external connection volume as a new first logical volume;
(B) making the second storage control apparatus set one of the one or more second logical volumes on an external volume and connect the external volume to one of the one or more second communication ports;
(C) determining whether a first communication port is connected to one of the one or more second communication ports among the plurality of first communication ports;

(D) selecting a migration source first communication port from the plurality of first communication ports when a first communication port, which can be connected to one of the one or more second communication ports, does not exist;

(E) selecting a migration destination first communication port from the plurality of first communication ports;

(F) making the first storage control apparatus connect a first logical volume connected to the migration source first communication port to the migration destination first communication port, and making the first storage control apparatus cancel connection between the first logical volume and the migration source first communication port;

(G) making the host computer switch a logical path for the first logical volume from the migration source first communication port to the migration destination first communication port and making the host computer cancel connection with the migration source first communication port;

(H) making the first storage control apparatus change an attribute of the migration source first communication port which was made to be a free communication port to a specified attribute that makes it possible to connect to the second communication port;

(I) making the first and second storage control apparatuses connect one of the one or more second communication ports to the migration source first communication port, thereby connecting the external logical volume to the migration source first communication port; and (J) making the first storage control apparatus connect the external connection volume to the migration source first communication port.

9. A storage system management method according to claim 8, in the step (C), in a case where a first communication port, which can be connected to one of the one or more second communication ports among the plurality of first communication ports, exists, the management method does not comprise the steps of (D), (E), (F), (G), and (H) and comprises the steps of (I) and (J).

10. A storage system management method according to claim 8, wherein the memory of the management computer is configured to store host management information for indicating whether or not the host computer comprises a path management program for managing a connection destination of the logical path for the plurality of first logical volumes, and
wherein the method further comprises, using the management computer,
in the step (D), selecting the migration source first communication port from one or more first communication ports connected to the host computer comprising the path management program, and
in the step (G), making the migration source first communication port the free communication port by using the path management program to change the connection destination of the logical path for the first logical volume from the migration source first communication port to the migration destination first communication port.

* * * * *